(12) United States Patent
Woo et al.

(10) Patent No.: US 10,681,460 B2
(45) Date of Patent: Jun. 9, 2020

(54) SYSTEMS AND METHODS FOR ASSOCIATING PLAYBACK DEVICES WITH VOICE ASSISTANT SERVICES

(71) Applicant: Sonos, Inc., Santa Barbara, CA (US)

(72) Inventors: Sein Woo, Somerville, MA (US); John G. Tolomei, Renton, WA (US)

(73) Assignee: Sonos, Inc., Santa Barbara, CA (US)

( * ) Notice: Subject to any disclaimer, the term of this patent is extended or adjusted under 35 U.S.C. 154(b) by 68 days.

(21) Appl. No.: 16/022,662

(22) Filed: Jun. 28, 2018

(65) Prior Publication Data

US 2020/0007987 A1    Jan. 2, 2020

(51) Int. Cl.
| | | |
|---|---|---|
| *H04R 3/12* | (2006.01) | |
| *G10L 15/22* | (2006.01) | |
| *G06F 3/16* | (2006.01) | |
| *G10L 15/28* | (2013.01) | |
| *H04R 27/00* | (2006.01) | |

(52) U.S. Cl.
CPC ............... *H04R 3/12* (2013.01); *G06F 3/165* (2013.01); *G10L 15/22* (2013.01); *G10L 15/28* (2013.01); *H04R 27/00* (2013.01); *G10L 2015/223* (2013.01); *H04R 2227/003* (2013.01); *H04R 2227/005* (2013.01)

(58) Field of Classification Search
CPC ......... G06F 3/165; G10L 15/22; G10L 15/28; G10L 2015/223; H04R 3/12; H04R 27/00; H04R 2227/003; H04R 2227/005
USPC .......................................................... 700/94
See application file for complete search history.

(56) References Cited

U.S. PATENT DOCUMENTS

| | | | |
|---|---|---|---|
| 4,741,038 A | 4/1988 | Elko et al. | |
| 4,941,187 A | 7/1990 | Slater | |
| 5,440,644 A | 8/1995 | Farinelli et al. | |
| 5,740,260 A | 4/1998 | Odom | |

(Continued)

FOREIGN PATENT DOCUMENTS

| | | |
|---|---|---|
| AU | 2017100486 A4 | 6/2017 |
| AU | 2017100581 A4 | 6/2017 |

(Continued)

OTHER PUBLICATIONS

US 9,299,346 B1, 03/2016, Hart et al. (withdrawn)

(Continued)

*Primary Examiner* — Hemant S Patel
(74) *Attorney, Agent, or Firm* — Fortem IP LLP; Matt Lincicum

(57) ABSTRACT

Systems and methods for media playback via a media playback system include detecting a first wake word via a first network microphone device of a first playback device, detecting a second wake word via a second network microphone device of a second playback device, and forming a bonded zone that includes the first playback device and the second playback device. In response to detecting the first wake word, a first voice first voice utterance following the first wake word is transmitted a first voice assistant service. In response to detecting the second wake word, a second voice utterance following the second wake word is transmitted to a second voice assistant service. Requested media content received from the first and/or second voice assistant service is played back via the first playback device and the second playback device in synchrony with one another.

20 Claims, 25 Drawing Sheets

(56) References Cited

U.S. PATENT DOCUMENTS

| | | |
|---|---|---|
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,301,603 B1 | 10/2001 | Maher et al. |
| 6,311,157 B1 | 10/2001 | Strong |
| 6,404,811 B1 | 6/2002 | Cvetko et al. |
| 6,469,633 B1 | 10/2002 | Wachter |
| 6,522,886 B1 | 2/2003 | Youngs et al. |
| 6,594,347 B1 | 7/2003 | Calder et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,661,107 B1 | 2/2010 | Van Dyke et al. |
| 7,702,508 B2 | 4/2010 | Bennett |
| 7,792,311 B1 | 9/2010 | Holmgren et al. |
| 7,853,341 B2 | 12/2010 | McCarty et al. |
| 7,987,294 B2 * | 7/2011 | Bryce .......... H04L 12/2809 709/208 |
| 8,014,423 B2 | 9/2011 | Thaler et al. |
| 8,041,565 B1 | 10/2011 | Bhardwaj et al. |
| 8,045,952 B2 | 10/2011 | Qureshey et al. |
| 8,073,125 B2 | 12/2011 | Zhang et al. |
| 8,103,009 B2 | 1/2012 | McCarty et al. |
| 8,234,395 B2 | 7/2012 | Millington et al. |
| 8,239,206 B1 | 8/2012 | Lebeau et al. |
| 8,255,224 B2 | 8/2012 | Singleton et al. |
| 8,290,603 B1 | 10/2012 | Lambourne |
| 8,364,481 B2 | 1/2013 | Strope et al. |
| 8,386,261 B2 | 2/2013 | Mellott et al. |
| 8,423,893 B2 | 4/2013 | Ramsay et al. |
| 8,428,758 B2 | 4/2013 | Naik et al. |
| 8,453,058 B1 | 5/2013 | Coccaro et al. |
| 8,483,853 B1 | 7/2013 | Lambourne |
| 8,484,025 B1 | 7/2013 | Moreno et al. |
| 8,831,761 B2 | 9/2014 | Kemp et al. |
| 8,831,957 B2 | 9/2014 | Taubman et al. |
| 8,938,394 B1 * | 1/2015 | Faaborg .......... G06F 3/167 704/270 |
| 8,942,252 B2 | 1/2015 | Balassanian et al. |
| 8,983,383 B1 | 3/2015 | Haskin |
| 8,983,844 B1 | 3/2015 | Thomas et al. |
| 9,042,556 B2 | 5/2015 | Kallai et al. |
| 9,094,539 B1 | 7/2015 | Noble |
| 9,215,545 B2 | 12/2015 | Dublin et al. |
| 9,251,793 B2 | 2/2016 | Lebeau et al. |
| 9,253,572 B2 | 2/2016 | Beddingfield, Sr. et al. |
| 9,262,612 B2 | 2/2016 | Cheyer |
| 9,288,597 B2 | 3/2016 | Carlsson et al. |
| 9,300,266 B2 | 3/2016 | Grokop |
| 9,318,107 B1 | 4/2016 | Sharifi |
| 9,319,816 B1 | 4/2016 | Narayanan |
| 9,368,105 B1 | 6/2016 | Freed et al. |
| 9,412,392 B2 | 8/2016 | Lindahl et al. |
| 9,426,567 B2 | 8/2016 | Lee et al. |
| 9,431,021 B1 | 8/2016 | Scalise et al. |
| 9,443,527 B1 | 9/2016 | Watanabe et al. |
| 9,472,201 B1 | 10/2016 | Sleator |
| 9,472,203 B1 | 10/2016 | Ayrapetian et al. |
| 9,484,030 B1 | 11/2016 | Meaney et al. |
| 9,489,948 B1 | 11/2016 | Chu et al. |
| 9,494,683 B1 | 11/2016 | Sadek |
| 9,509,269 B1 | 11/2016 | Rosenberg |
| 9,514,752 B2 | 12/2016 | Sharifi |
| 9,536,541 B2 | 1/2017 | Chen et al. |
| 9,548,053 B1 | 1/2017 | Basye et al. |
| 9,548,066 B2 | 1/2017 | Jain et al. |
| 9,552,816 B2 | 1/2017 | Vanlund et al. |
| 9,560,441 B1 | 1/2017 | McDonough, Jr. et al. |
| 9,601,116 B2 | 3/2017 | Casado et al. |
| 9,615,170 B2 | 4/2017 | Kirsch et al. |
| 9,615,171 B1 | 4/2017 | O'Neill et al. |
| 9,632,748 B2 | 4/2017 | Faaborg et al. |
| 9,633,186 B2 | 4/2017 | Ingrassia, Jr. et al. |
| 9,633,368 B2 | 4/2017 | Greenzeiger et al. |
| 9,633,660 B2 | 4/2017 | Haughay et al. |
| 9,633,671 B2 | 4/2017 | Giacobello et al. |
| 9,633,674 B2 | 4/2017 | Sinha et al. |
| 9,640,179 B1 | 5/2017 | Hart et al. |
| 9,640,183 B2 | 5/2017 | Jung et al. |
| 9,641,919 B1 | 5/2017 | Poole et al. |
| 9,646,614 B2 | 5/2017 | Bellegarda et al. |
| 9,653,060 B1 | 5/2017 | Hilmes et al. |
| 9,653,075 B1 | 5/2017 | Chen et al. |
| 9,659,555 B1 | 5/2017 | Hilmes et al. |
| 9,672,821 B2 | 6/2017 | Krishnaswamy et al. |
| 9,685,171 B1 | 6/2017 | Yang |
| 9,691,378 B1 | 6/2017 | Meyers et al. |
| 9,691,379 B1 | 6/2017 | Mathias et al. |
| 9,697,826 B2 | 7/2017 | Sainath et al. |
| 9,697,828 B1 | 7/2017 | Prasad et al. |
| 9,698,999 B2 | 7/2017 | Mutagi et al. |
| 9,704,478 B1 | 7/2017 | Vitaladevuni et al. |
| 9,721,566 B2 | 8/2017 | Newendorp et al. |
| 9,721,568 B1 | 8/2017 | Polansky et al. |
| 9,721,570 B1 | 8/2017 | Beal et al. |
| 9,728,188 B1 | 8/2017 | Rosen et al. |
| 9,734,822 B1 | 8/2017 | Sundaram et al. |
| 9,747,011 B2 | 8/2017 | Lewis et al. |
| 9,747,899 B2 | 8/2017 | Pogue et al. |
| 9,747,920 B2 | 8/2017 | Ayrapetian et al. |
| 9,747,926 B2 | 8/2017 | Sharifi et al. |
| 9,754,605 B1 | 9/2017 | Chhetri |
| 9,762,967 B2 | 9/2017 | Clarke et al. |
| 9,811,314 B2 | 11/2017 | Plagge et al. |
| 9,813,810 B1 | 11/2017 | Nongpiur |
| 9,820,036 B1 | 11/2017 | Tritschler et al. |
| 9,820,039 B2 | 11/2017 | Lang |
| 9,826,306 B2 | 11/2017 | Lang |
| 9,865,259 B1 | 1/2018 | Typrin et al. |
| 9,865,264 B2 | 1/2018 | Gelfenbeyn et al. |
| 9,881,616 B2 | 1/2018 | Beckley et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0034280 A1 | 3/2002 | Infosino |
| 2002/0072816 A1 | 6/2002 | Shdema et al. |
| 2002/0124097 A1 | 9/2002 | Isely et al. |
| 2003/0040908 A1 | 2/2003 | Yang et al. |
| 2003/0072462 A1 | 4/2003 | Hlibowicki |
| 2003/0157951 A1 | 8/2003 | Hasty |
| 2004/0024478 A1 | 2/2004 | Hans et al. |
| 2004/0093219 A1 | 5/2004 | Shin et al. |
| 2005/0164664 A1 | 7/2005 | DiFonzo et al. |
| 2005/0195988 A1 | 9/2005 | Tashev et al. |
| 2005/0268234 A1 | 12/2005 | Rossi, Jr. et al. |
| 2005/0283330 A1 | 12/2005 | Laraia et al. |
| 2006/0147058 A1 | 7/2006 | Wang |
| 2006/0190968 A1 | 8/2006 | Jung et al. |
| 2006/0247913 A1 | 11/2006 | Huerta et al. |
| 2006/0262943 A1 | 11/2006 | Oxford |
| 2007/0018844 A1 | 1/2007 | Sutardja |
| 2007/0019815 A1 | 1/2007 | Asada et al. |
| 2007/0033043 A1 | 2/2007 | Hyakumoto |
| 2007/0071255 A1 | 3/2007 | Schobben |
| 2007/0076131 A1 | 4/2007 | Li et al. |
| 2007/0140058 A1 | 6/2007 | McIntosh et al. |
| 2007/0142944 A1 | 6/2007 | Goldberg et al. |
| 2008/0090537 A1 | 4/2008 | Sutardja |
| 2008/0221897 A1 | 9/2008 | Cerra et al. |
| 2008/0248797 A1 | 10/2008 | Freeman et al. |
| 2008/0301729 A1 | 12/2008 | Broos et al. |

(56) References Cited

U.S. PATENT DOCUMENTS

| | | |
|---|---|---|
| 2009/0003620 A1 | 1/2009 | McKillop et al. |
| 2009/0005893 A1 | 1/2009 | Sugii et al. |
| 2009/0018828 A1 | 1/2009 | Nakadai et al. |
| 2009/0076821 A1 | 3/2009 | Brenner et al. |
| 2009/0197524 A1 | 8/2009 | Haff et al. |
| 2009/0228919 A1 | 9/2009 | Zott et al. |
| 2009/0238377 A1 | 9/2009 | Ramakrishnan et al. |
| 2009/0264072 A1 | 10/2009 | Dai |
| 2009/0326949 A1 | 12/2009 | Douthitt et al. |
| 2010/0014690 A1 | 1/2010 | Wolff et al. |
| 2010/0023638 A1 | 1/2010 | Bowman |
| 2010/0075723 A1 | 3/2010 | Min et al. |
| 2010/0179874 A1 | 7/2010 | Higgins et al. |
| 2010/0211199 A1 | 8/2010 | Naik et al. |
| 2011/0033059 A1 | 2/2011 | Bhaskar et al. |
| 2011/0091055 A1 | 4/2011 | Leblanc |
| 2011/0145581 A1 | 6/2011 | Malhotra et al. |
| 2011/0267985 A1 | 11/2011 | Wilkinson et al. |
| 2011/0276333 A1 | 11/2011 | Wang et al. |
| 2011/0280422 A1 | 11/2011 | Neumeyer et al. |
| 2011/0299706 A1 | 12/2011 | Sakai |
| 2012/0078635 A1 | 3/2012 | Rothkopf et al. |
| 2012/0131125 A1 | 5/2012 | Seidel et al. |
| 2012/0148075 A1 | 6/2012 | Goh et al. |
| 2012/0163603 A1 | 6/2012 | Abe et al. |
| 2012/0177215 A1 | 7/2012 | Bose et al. |
| 2012/0297284 A1 | 11/2012 | Matthews, III et al. |
| 2013/0006453 A1 | 1/2013 | Wang et al. |
| 2013/0024018 A1 | 1/2013 | Chang et al. |
| 2013/0058492 A1 | 3/2013 | Silzle et al. |
| 2013/0066453 A1 | 3/2013 | Seefeldt |
| 2013/0148821 A1 | 6/2013 | Sorensen |
| 2013/0179173 A1 | 7/2013 | Lee et al. |
| 2013/0183944 A1 | 7/2013 | Mozer et al. |
| 2013/0191122 A1 | 7/2013 | Mason |
| 2013/0216056 A1 | 8/2013 | Thyssen |
| 2013/0317635 A1 | 11/2013 | Bates et al. |
| 2013/0329896 A1 | 12/2013 | Krishnaswamy et al. |
| 2013/0331970 A1* | 12/2013 | Beckhardt ............... G06F 3/165 700/94 |
| 2013/0332165 A1 | 12/2013 | Beckley et al. |
| 2013/0343567 A1 | 12/2013 | Triplett et al. |
| 2014/0003611 A1 | 1/2014 | Mohammad et al. |
| 2014/0003635 A1 | 1/2014 | Mohammad et al. |
| 2014/0006026 A1 | 1/2014 | Lamb et al. |
| 2014/0064501 A1 | 3/2014 | Olsen et al. |
| 2014/0075306 A1 | 3/2014 | Rega |
| 2014/0094151 A1 | 4/2014 | Klappert et al. |
| 2014/0100854 A1 | 4/2014 | Chen et al. |
| 2014/0167931 A1 | 6/2014 | Lee et al. |
| 2014/0195252 A1 | 7/2014 | Gruber et al. |
| 2014/0244013 A1 | 8/2014 | Reilly |
| 2014/0258292 A1 | 9/2014 | Thramann et al. |
| 2014/0270282 A1 | 9/2014 | Tammi et al. |
| 2014/0274185 A1 | 9/2014 | Luna et al. |
| 2014/0274203 A1 | 9/2014 | Ganong, III et al. |
| 2014/0277650 A1 | 9/2014 | Zurek et al. |
| 2014/0363022 A1 | 12/2014 | Dizon et al. |
| 2014/0372109 A1 | 12/2014 | Iyer et al. |
| 2015/0010169 A1 | 1/2015 | Popova et al. |
| 2015/0016642 A1 | 1/2015 | Walsh et al. |
| 2015/0063580 A1 | 3/2015 | Huang et al. |
| 2015/0086034 A1 | 3/2015 | Lombardi et al. |
| 2015/0091709 A1* | 4/2015 | Reichert ............... G08C 17/02 340/12.22 |
| 2015/0092947 A1* | 4/2015 | Gossain ............... G11B 27/002 381/58 |
| 2015/0104037 A1 | 4/2015 | Lee et al. |
| 2015/0154976 A1 | 6/2015 | Mutagi |
| 2015/0170645 A1 | 6/2015 | Di Censo et al. |
| 2015/0180432 A1 | 6/2015 | Gao et al. |
| 2015/0189438 A1 | 7/2015 | Hampiholi et al. |
| 2015/0200454 A1 | 7/2015 | Heusdens et al. |
| 2015/0222987 A1 | 8/2015 | Angel, Jr. et al. |
| 2015/0228274 A1 | 8/2015 | Leppänen et al. |
| 2015/0253292 A1 | 9/2015 | Larkin et al. |
| 2015/0253960 A1 | 9/2015 | Lin et al. |
| 2015/0271593 A1 | 9/2015 | Sun et al. |
| 2015/0280676 A1 | 10/2015 | Holman et al. |
| 2015/0296299 A1 | 10/2015 | Klippel et al. |
| 2015/0302856 A1 | 10/2015 | Kim et al. |
| 2015/0341406 A1 | 11/2015 | Rockefeller et al. |
| 2015/0363061 A1 | 12/2015 | De Nigris, III et al. |
| 2015/0363401 A1 | 12/2015 | Chen et al. |
| 2015/0371657 A1 | 12/2015 | Gao et al. |
| 2015/0380010 A1 | 12/2015 | Srinivasan |
| 2016/0007116 A1 | 1/2016 | Holman |
| 2016/0021458 A1 | 1/2016 | Johnson et al. |
| 2016/0026428 A1* | 1/2016 | Morganstern ............ G06F 3/165 700/94 |
| 2016/0029142 A1 | 1/2016 | Isaac et al. |
| 2016/0036962 A1 | 2/2016 | Rand et al. |
| 2016/0042748 A1 | 2/2016 | Jain et al. |
| 2016/0044151 A1 | 2/2016 | Shoemaker et al. |
| 2016/0057522 A1 | 2/2016 | Choisel et al. |
| 2016/0077710 A1 | 3/2016 | Lewis et al. |
| 2016/0088392 A1 | 3/2016 | Huttunen et al. |
| 2016/0093304 A1 | 3/2016 | Kim et al. |
| 2016/0098393 A1 | 4/2016 | Hebert |
| 2016/0155443 A1 | 6/2016 | Khan et al. |
| 2016/0157035 A1 | 6/2016 | Russell et al. |
| 2016/0173578 A1 | 6/2016 | Sharma et al. |
| 2016/0212538 A1 | 7/2016 | Fullam et al. |
| 2016/0225385 A1 | 8/2016 | Hammarqvist |
| 2016/0232451 A1 | 8/2016 | Scherzer |
| 2016/0234204 A1 | 8/2016 | Rishi et al. |
| 2016/0239255 A1 | 8/2016 | Chavez et al. |
| 2016/0260431 A1 | 9/2016 | Newendorp et al. |
| 2016/0314782 A1 | 10/2016 | Klimanis |
| 2016/0352915 A1 | 12/2016 | Gautama |
| 2016/0353218 A1 | 12/2016 | Starobin et al. |
| 2016/0357503 A1* | 12/2016 | Triplett .................. G06F 3/165 |
| 2017/0003931 A1 | 1/2017 | Dvortsov et al. |
| 2017/0026769 A1 | 1/2017 | Patel |
| 2017/0060526 A1 | 3/2017 | Barton et al. |
| 2017/0070478 A1 | 3/2017 | Park et al. |
| 2017/0076720 A1* | 3/2017 | Gopalan ................ G06F 3/167 |
| 2017/0078824 A1 | 3/2017 | Heo |
| 2017/0084292 A1 | 3/2017 | Yoo |
| 2017/0090864 A1* | 3/2017 | Jorgovanovic .......... G06F 3/167 |
| 2017/0092278 A1 | 3/2017 | Evermann et al. |
| 2017/0092297 A1 | 3/2017 | Sainath et al. |
| 2017/0103755 A1 | 4/2017 | Jeon et al. |
| 2017/0110144 A1* | 4/2017 | Sharifi ................... G10L 17/08 |
| 2017/0125037 A1 | 5/2017 | Shin |
| 2017/0140759 A1 | 5/2017 | Kumar et al. |
| 2017/0177585 A1 | 6/2017 | Rodger et al. |
| 2017/0178662 A1 | 6/2017 | Ayrapetian et al. |
| 2017/0193999 A1 | 7/2017 | Aleksic et al. |
| 2017/0206896 A1 | 7/2017 | Ko et al. |
| 2017/0214996 A1 | 7/2017 | Yeo |
| 2017/0236512 A1* | 8/2017 | Williams ................ G06F 16/68 381/79 |
| 2017/0242651 A1 | 8/2017 | Lang et al. |
| 2017/0242653 A1 | 8/2017 | Lang et al. |
| 2017/0270919 A1 | 9/2017 | Parthasarathi et al. |
| 2017/0353789 A1 | 12/2017 | Kim et al. |
| 2018/0033428 A1 | 2/2018 | Kim et al. |
| 2018/0040324 A1 | 2/2018 | Wilberding |
| 2018/0130469 A1 | 5/2018 | Gruenstein et al. |

FOREIGN PATENT DOCUMENTS

| | | |
|---|---|---|
| CN | 103546616 A | 1/2014 |
| EP | 1349146 A1 | 10/2003 |
| EP | 1389853 A1 | 2/2004 |
| EP | 2351021 B1 | 9/2017 |
| JP | 2001236093 A | 8/2001 |
| JP | 2004347943 A | 12/2004 |
| JP | 2004354721 A | 12/2004 |
| JP | 2005284492 A | 10/2005 |
| JP | 2008079256 A | 4/2008 |
| JP | 2008158868 A | 7/2008 |
| JP | 2010141748 A | 6/2010 |

(56) References Cited

FOREIGN PATENT DOCUMENTS

| | | | |
|---|---|---|---|
| JP | 2013037148 A | 2/2013 | |
| JP | 2014071138 A | 4/2014 | |
| JP | 2014137590 A | 7/2014 | |
| KR | 20100111071 A | 10/2010 | |
| WO | 200153994 | 7/2001 | |
| WO | 2003093950 A2 | 11/2003 | |
| WO | 2015037396 A1 | 3/2015 | |
| WO | 2015178950 A1 | 11/2015 | |
| WO | 2016033364 A1 | 3/2016 | |
| WO | 2017039632 A1 | 3/2017 | |

OTHER PUBLICATIONS

Non-Final Office Action dated Feb. 6, 2018, issued in connection with U.S. Appl. No. 15/211,689, filed Jul. 15, 2016, 32 pages.
Non-Final Office Action dated Feb. 6, 2018, issued in connection with U.S. Appl. No. 15/237,133, filed Aug. 15, 2016, 6 pages.
Non-Final Office Action dated Sep. 6, 2017, issued in connection with U.S. Appl. No. 15/131,254, filed Apr. 18, 2016, 13 pages.
Non-Final Office Action dated Sep. 6, 2018, issued in connection with U.S. Appl. No. 15/098,760, filed Apr. 14, 2016, 29 pages.
Non-Final Office Action dated Apr. 9, 2018, issued in connection with U.S. Appl. No. 15/804,776, filed Nov. 6, 2017, 18 pages.
Non-Final Office Action dated May 9, 2018, issued in connection with U.S. Appl. No. 15/818,051, filed Nov. 20, 2017, 22 pages.
Notice of Allowance dated Dec. 4, 2017, issued in connection with U.S. Appl. No. 15/277,810, filed Sep. 27, 2016, 5 pages.
Notice of Allowance dated Jul. 5, 2018, issued in connection with U.S. Appl. No. 15/237,133, filed Aug. 15, 2016, 5 pages.
Notice of Allowance dated Jul. 9, 2018, issued in connection with U.S. Appl. No. 15/438,741, filed Feb. 21, 2017, 5 pages.
Notice of Allowance dated Apr. 11, 2018, issued in connection with U.S. Appl. No. 15/719,454, filed Sep. 28, 2017, 15 pages.
Notice of Allowance dated Jul. 12, 2017, issued in connection with U.S. Appl. No. 15/098,805, filed Apr. 14, 2016, 8 pages.
Notice of Allowance dated Dec. 13, 2017, issued in connection with U.S. Appl. No. 15/784,952, filed Oct. 16, 2017, 9 pages.
Notice of Allowance dated Aug. 14, 2017, issued in connection with U.S. Appl. No. 15/098,867, filed Apr. 14, 2016, 10 pages.
Notice of Allowance dated Feb. 14, 2017, issued in connection with U.S. Appl. No. 15/229,855, filed Aug. 5, 2016, 11 pages.
Notice of Allowance dated Jun. 14, 2017, issued in connection with U.S. Appl. No. 15/282,554, filed Sep. 30, 2016, 11 pages.
Notice of Allowance dated Dec. 15, 2017, issued in connection with U.S. Appl. No. 15/223,218, filed Jul. 29, 2016, 7 pages.
Notice of Allowance dated Aug. 16, 2017, issued in connection with U.S. Appl. No. 15/098,892, filed Apr. 14, 2016, 9 pages.
Notice of Allowance dated Aug. 17, 2017, issued in connection with U.S. Appl. No. 15/131,244, filed Apr. 18, 2016, 9 pages.
Notice of Allowance dated Jul. 19, 2018, issued in connection with U.S. Appl. No. 15/681,937, filed Aug. 21, 2017, 7 pages.
Notice of Allowance dated Mar. 20, 2018, issued in connection with U.S. Appl. No. 15/784,952, filed Oct. 16, 2017, 7 pages.
Notice of Allowance dated Aug. 22, 2017, issued in connection with U.S. Appl. No. 15/273,679, filed Sep. 22, 2016, 5 pages.
Notice of Allowance dated Jan. 22, 2018, issued in connection with U.S. Appl. No. 15/178,180, filed Jun. 9, 2016, 9 pages.
Notice of Allowance dated Dec. 29, 2017, issued in connection with U.S. Appl. No. 15/131,776, filed Apr. 18, 2016, 13 pages.
Notice of Allowance dated Jul. 30, 2018, issued in connection with U.S. Appl. No. 15/098,718, filed Apr. 14, 2016, 5 pages.
Notice of Allowance dated Aug. 9, 2018, issued in connection with U.S. Appl. No. 15/229,868, filed Aug. 5, 2016, 11 pages.
Notice of Allowance dated Mar. 9, 2018, issued in connection with U.S. Appl. No. 15/584,782, filed May 2, 2017, 8 pages.
Palm, Inc., "Handbook for the Palm VII Handheld," May 2000, 311 pages.
Presentations at WinHEC 2000, May 2000, 138 pages.
Restriction Requirement dated Aug. 9, 2018, issued in connection with U.S. Appl. No. 15/717,621, filed Sep. 27, 2017, 8 pages.
Tsiami et al. "Experiments in acoustic source localization using sparse arrays in adverse indoors environments", 2014 22nd European Signal Processing Conference, Sep. 1, 2014, 5 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Non-Final Office Action dated Feb. 7, 2017, issued in connection with U.S. Appl. No. 15/131,244, filed Apr. 18, 2016, 12 pages.
Non-Final Office Action dated Feb. 8, 2017, issued in connection with U.S. Appl. No. 15/098,892, filed Apr. 14, 2016, 17 pages.
Non-Final Office Action dated Mar. 9, 2017, issued in connection with U.S. Appl. No. 15/098,760, filed Apr. 14, 2016, 13 pages.
Non-Final Office Action dated Jan. 10, 2018, issued in connection with U.S. Appl. No. 15/098,718, filed Apr. 14, 2016, 15 pages.
Non-Final Office Action dated Jan. 10, 2018, issued in connection with U.S. Appl. No. 15/229,868, filed Aug. 5, 2016, 13 pages.
Non-Final Office Action dated Jan. 10, 2018, issued in connection with U.S. Appl. No. 15/438,725, filed Feb. 21, 2017, 15 pages.
Non-Final Office Action dated Sep. 10, 2018, issued in connection with U.S. Appl. No. 15/670,361, filed Aug. 7, 2017, 17 pages.
Non-Final Office Action dated Dec. 12, 2016, issued in connection with U.S. Appl. No. 15/098,718, filed Apr. 14, 2016, 11 pages.
Non-Final Office Action dated Jan. 13, 2017, issued in connection with U.S. Appl. No. 15/098,805, filed Apr. 14, 2016, 11 pages.
Non-Final Office Action dated Sep. 14, 2017, issued in connection with U.S. Appl. No. 15/178,180, filed Jun. 9, 2016, 16 pages.
Non-Final Office Action dated Mar. 16, 2018, issued in connection with U.S. Appl. No. 15/681,937, filed Aug. 21 2017, 5 pages.
Non-Final Office Action dated Apr. 18, 2018, issued in connection with U.S. Appl. No. 15/811,468, filed Nov. 13, 2017, 14 pages.
Non-Final Office Action dated Apr. 19, 2017, issued in connection with U.S. Appl. No. 15/131,776, filed Apr. 18, 2016, 12 pages.
Non-Final Office Action dated Feb. 20, 2018, issued in connection with U.S. Appl. No. 15/211,748, filed Jul. 15, 2016, 31 pages.
Non-Final Office Action dated May 22, 2018, issued in connection with U.S. Appl. No. 15/946,599, filed Apr. 5, 2018, 19 pages.
Non-Final Office Action dated Jul. 25, 2017, issued in connection with U.S. Appl. No. 15/273,679, filed Jul. 22, 2016, 11 pages.
Non-Final Office Action dated Jan. 26, 2017, issued in connection with U.S. Appl. No. 15/098,867, filed Apr. 14, 2016, 16 pages.
Non-Final Office Action dated Oct. 26, 2017, issued in connection with U.S. Appl. No. 15/438,744, filed Feb. 21, 2017, 12 pages.
Non-Final Office Action dated Jun. 27, 2018, issued in connection with U.S. Appl. No. 15/438,749, filed Feb. 21, 2017, 16 pages.
Non-Final Office Action dated Jun. 30, 2017, issued in connection with U.S. Appl. No. 15/277,810, filed Sep. 27, 2016, 13 pages.
Advisory Action dated Jun. 28, 2018, issued in connection with U.S. Appl. No. 15/438,744, filed Feb. 21, 2017, 3 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.

(56) References Cited

OTHER PUBLICATIONS

Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Corrected Notice of Allowability dated Mar. 8, 2017, issued in connection with U.S. Appl. No. 15/229,855, filed Aug. 5, 2016, 6 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report dated Oct. 30, 2017, issued in connection with EP Application No. 17174435.2, 11 pages.
Final Office Action dated Oct. 6, 2017, issued in connection with U.S. Appl. No. 15/098,760, filed Apr. 14, 2016, 25 pages.
Final Office Action dated Aug. 11, 2017, issued in connection with U.S. Appl. No. 15/131,776, filed Apr. 18, 2016, 7 pages.
Final Office Action dated Apr. 13, 2018, issued in connection with U.S. Appl. No. 15/131,254, filed Apr. 18, 2016, 18 pages.
Final Office Action dated Apr. 13, 2018, issued in connection with U.S. Appl. No. 15/438,744, filed Feb. 21, 2017, 20 pages.
Final Office Action dated Jun. 15, 2017, issued in connection with U.S. Appl. No. 15/098,718, filed Apr. 14, 2016, 15 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.
Freiberger, Karl, "Development and Evaluation of Source Localization Algorithms for Coincident Microphone Arrays," Diploma Thesis, Apr. 1, 2010, 106 pages.
International Searching Authority, International Search Report and Written Opinion dated Nov. 22, 2017, issued in connection with International Application No. PCT/US2017/054063, filed on Sep. 28, 2017, 11 pages.
International Searching Authority, International Search Report and Written Opinion dated May 23, 2017, issued in connection with International Application No. PCT/US2017/018739, Filed on Feb. 21, 2017, 10 pages.
International Searching Authority, International Search Report and Written Opinion dated Oct. 23, 2017, issued in connection with International Application No. PCT/US2017/042170, filed on Jul. 14, 2017, 15 pages.
International Searching Authority, International Search Report and Written Opinion dated Oct. 24, 2017, issued in connection with International Application No. PCT/US2017/042227, filed on Jul. 14, 2017, 16 pages.
International Searching Authority, International Search Report and Written Opinion dated May 30, 2017, issued in connection with International Application No. PCT/US2017/018728, Filed on Feb. 21, 2017, 11 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Morales-Cordovilla et al. "Room Localization for Distant Speech Recognition," Proceedings of Interspeech 2014, Sep. 14, 2014, 4 pages.
Non-Final Office Action dated Jun. 1, 2017, issued in connection with U.S. Appl. No. 15/223,218, filed Jul. 29, 2016, 7 pages.
Non-Final Office Action dated Nov. 2, 2017, issued in connection with U.S. Appl. No. 15/584,782, filed May 2, 2017, 11 pages.
Non-Final Office Action dated Nov. 3, 2017, issued in connection with U.S. Appl. No. 15/438,741, filed Feb. 21, 2017, 11 pages.

\* cited by examiner

SYSTEMS AND METHODS FOR ASSOCIATING PLAYBACK DEVICES WITH VOICE ASSISTANT SERVICES

TECHNICAL FIELD

The present technology relates to consumer goods and, more particularly, to methods, systems, products, features, services, and other elements directed to associating playback devices with voice assistant services or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1A:
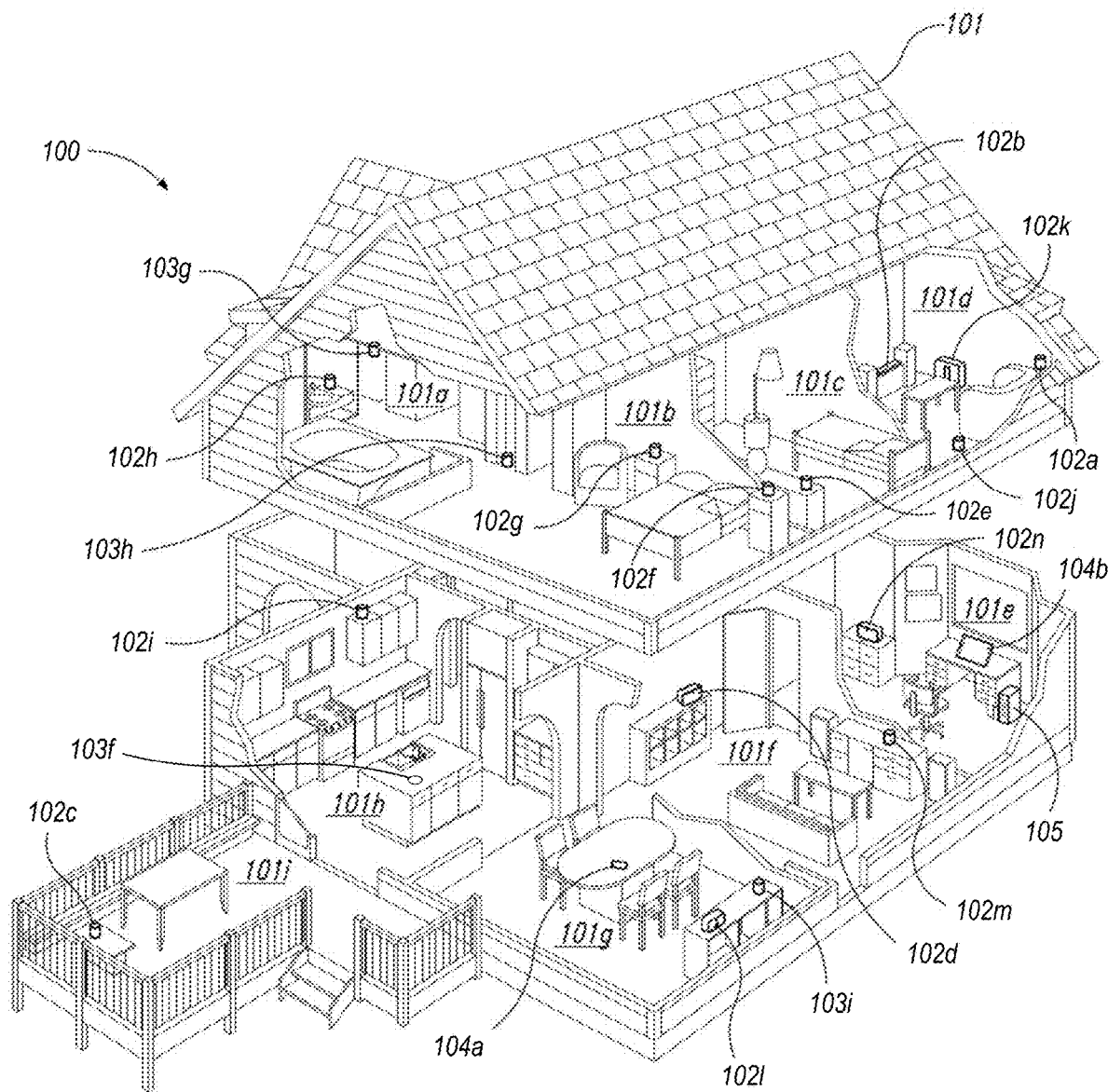
FIG. 1A is a partial cutaway view of an environment having a media playback system configured in accordance with aspects of the disclosed technology.

The drawings are for purposes of illustrating example embodiments, but it is understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

Voice control can be beneficial for a "smart" home having smart appliances and related devices, such as wireless illumination devices, home-automation devices (e.g., thermostats, door locks, etc.), and audio playback devices. In some implementations, networked microphone devices may be used to control smart home devices. A network microphone device will typically include a microphone for receiving voice inputs. The network microphone device can forward voice inputs to a voice assistant service (VAS), such as AMAZON's ALEXA®, APPLE's SIRI®, MICROSOFT's CORTANA®, GOOGLE's Assistant, etc. A VAS may be a remote service implemented by cloud servers to process voice inputs. A VAS may process a voice input to determine an intent of the voice input. Based on the response, the network microphone device may cause one or more smart devices to perform an action. For example, the network microphone device may instruct an illumination device to turn on/off based on the response to the instruction from the VAS.

A voice input detected by a network microphone device will typically include a wake word followed by an utterance containing a user request. The wake word is typically a predetermined word or phrase used to "wake up" and invoke the VAS for interpreting the intent of the voice input. For instance, in querying AMAZON's ALEXA®, a user might speak the wake word "Alexa." Other examples include "Ok, Google" for invoking GOOGLE's Assistant, and "Hey, Siri" for invoking APPLE's SIRI®, or "Hey, Sonos" for a VAS offered by SONOS®. In various embodiments, a wake word may also be referred to as, e.g., an activation-, trigger-, wakeup-word or phrase, and may take the form of any suitable word; combination of words, such as phrases; and/or audio cues indicating that the network microphone device and/or an associated VAS is to invoke an action.

A network microphone device listens for a user request or command accompanying a wake word in the voice input. In some instances, the user request may include a command to control a third-party device, such as a thermostat (e.g., NEST® thermostat), an illumination device (e.g., a PHILIPS HUE® lighting device), or a media playback device (e.g., a SONOS® playback device). For example, a user might speak the wake word "Alexa" followed by the utterance "set the thermostat to 68 degrees" to set the temperature in a home using AMAZON's ALEXA® VAS. A user might speak the same wake word followed by the utterance "turn on the living room" to turn on illumination devices in a living room area of the home. The user may similarly speak a wake word followed by a request to play a particular song, an album, or a playlist of music on a playback device in the home.

A VAS may employ natural language understanding (NLU) systems to process voice inputs. NLU systems typically require multiple remote servers that are programmed to detect the underlying intent of a given voice input. For example, the servers may maintain a lexicon of language; parsers; grammar and semantic rules; and associated processing algorithms to determine the user's intent.

It can be difficult to manage the association between various playback devices with one or more corresponding VASes. For example, although a user may wish to utilize multiple VASes within her home, it may not be possible or preferable to associate a single playback device with more than one VAS. This may be due to the constraints of processing power and memory required to perform multiple wake word detection algorithms on a single device, or it may be due to restrictions imposed by one or more VASes. As a result, for any particular playback device, a user may be required to select only a single VAS to the exclusion of any other VASes.

In some embodiments, a playback device may be purchased with a pre-associated VAS. In such instances, a user may wish to replace the pre-associated VAS with a different VAS of the user's choosing. For example, if a user purchases a playback device that is associated with AMAZON's ALEXA® VAS, the user may wish to instead associate the playback device with GOOGLE's Assistant VAS, and to deactivate AMAZON's ALEXA® on that playback device. Additionally, some voice-enabled playback devices may be sold without any pre-associated VAS, in which cases a user may wish to manage the selection and association of a particular VAS with the playback device.

The systems and methods detailed herein address the above-mentioned challenges of managing associations between one or more playback devices and one or more VASes. In particular, systems and methods are provided for allowing a user to select a VAS from among multiple VASes to associate with one or more playback devices of a media playback system.

As described in more detail below, in some instances two or more playback devices that are individually associated with different VASes can be bonded together to form a bonded zone. For example, first and second playback devices can be bonded to form a stereo pair. In this instance, the bonded pair of devices can present to the media playback system as a single user interface (UI) entity. When displayed to a user via a user interface (e.g., a UI displayed on a screen of a controller device), the bonded pair can be displayed as a single "device" for control. The individual playback devices of the bonded zone can be associated with different VASes. For example, the first playback device can be associated with AMAZON's ALEXA® while the second playback device of the bonded zone is associated with GOOGLE's Assistant. As a result, a single "device" or UI entity presented to the media playback system can be effectively associated with two different VASes. This allows a user to interact with a single UI entity (i.e., the bonded zone, which appears as a single device via the media playback system) which can in turn interact with two different VASes. For example, a user can use a first wake word such as "Alexa" to interact via voice input with AMAZON's ALEXA®, and alternately use a second wake word such as "OK, Google" to interact via voice input with GOOGLE's Assistant. Accordingly, even if individual playback devices cannot be associated with multiple VASes, a user may have access to multiple VASes through a single UI entity via the bonded zone. This advantageously allows a user to realize the benefits of multiple VASes, each of which may excel in different aspects, rather than requiring a user to limit her interactions to a single VAS to the exclusion of any others.

In some embodiments, a bonded zone can include three or more voice assistants. For example, in a home theatre context in which five devices are bonded into a single zone, a left channel playback device can be associated with AMAZON'S ALEXA, the right channel device can be associated with MICROSOFT'S CORTANA, and the middle channel playback device can be associated with GOOGLE'S Assistant. In another example, the left and right channel devices may be associated with a first VAS (e.g., AMAZON'S ALEXA), while the middle channel is associated with a second VAS (e.g., GOOGLE'S Assistant).

While some embodiments described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

Figure 1B:
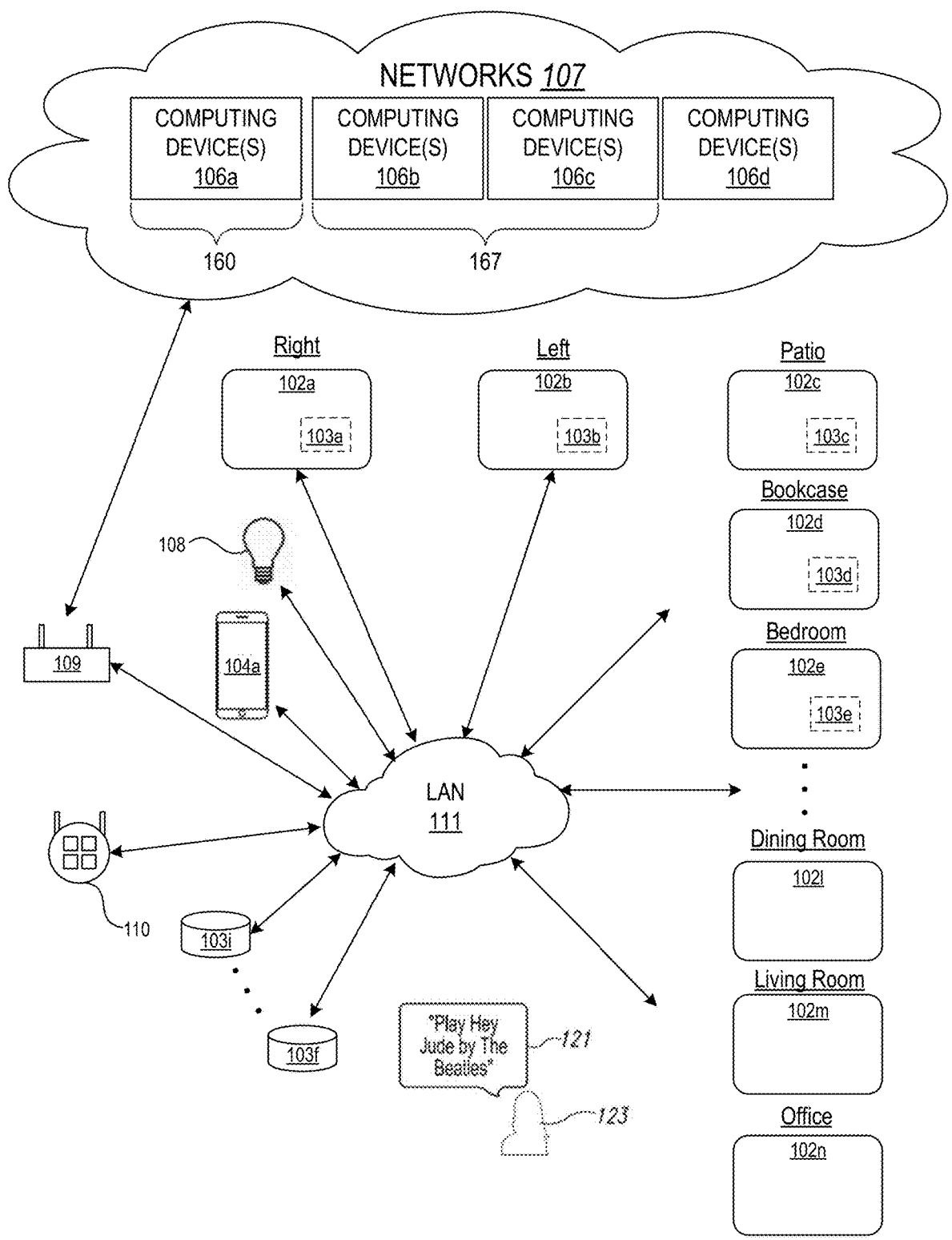
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment" or "environment 101". The environment 101 comprises a household having several rooms, spaces, and/or playback zones, including a master bathroom 101*a*, a master bedroom 101*b* (referred to herein as "Nick's Room"), a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102n), network microphone devices 103 (identified individually as "NMD(s)" 103a-103i), and controller devices 104a and 104b (collectively "controller devices 104"). The home environment may include additional and/or other computing devices, including local network devices, such as one or more smart illumination devices 108 (FIG. 1B), and a smart thermostat 110, and a local computing device 105 (FIG. 1A).

Referring to FIG. 1B, the various playback, network microphone, and controller devices 102-104 and/or other network devices of the MPS 100 may be coupled to one another via point-to-point connections and/or over other connections, which may be wired and/or wireless, via a LAN 111 including a network router 109. For example, the playback device 102j (which may be designated as "Left") in the Den 101d (FIG. 1A) may have a point-to-point connection with the playback device 102a in the Den 101d (which may be designated as "Right"). In one embodiment, the Left playback device 102j may communicate over the point-to-point connection with the Right playback device 102a. In a related embodiment, the Left playback device 102j may communicate with other network devices via the point-to-point connection and/or other connections via the LAN 111.

As further shown in FIG. 1B, in some embodiments the MPS 100 is coupled to one or more remote computing devices 106, which may comprise different groups of remote computing devices 106a-106c associated with various services, including voice assistant services ("VAS(es)"), media content services ("MCS(es)"), and/or services for supporting operations of the MPS 100 via a wide area network (WAN) 107. In some embodiments, the remote computing device(s) may be cloud servers. The remote computing device(s) 106 may be configured to interact with computing devices in the environment 101 in various ways. For example, the remote computing device(s) 106 may be configured to facilitate streaming and controlling playback of media content, such as audio, in the home environment. In one aspect of the technology described in greater detail below, the various playback devices, network microphone devices, and/or controller devices 102-104 are coupled to at least one remote computing device associated with a VAS, and at least one remote computing device associated with a media content service. Also, as described in greater detail below, in some embodiments the various playback devices, network microphone devices, and/or controller devices 102-104 may be coupled to several remote computing devices, each associated with a different VAS and/or to a plurality of remote computing devices associated with multiple different media content services.

In some embodiments, one or more of the playback devices 102 may include an onboard (e.g., integrated) network microphone device. For example, the playback devices 102a-e include corresponding NMDs 103a-e, respectively. Playback devices that include network microphone devices may be referred to herein interchangeably as a playback device or a network microphone device unless indicated otherwise in the description.

In some embodiments, one or more of the NMDs 103 may be a stand-alone device. For example, the NMDs 103f and 103g may be stand-alone network microphone devices. A stand-alone network microphone device may omit components typically included in a playback device, such as a speaker or related electronics. In such cases, a stand-alone network microphone device may not produce audio output or may produce limited audio output (e.g., relatively low-quality audio output).

In use, a network microphone device may receive and process voice inputs from a user in its vicinity. For example, a network microphone device may capture a voice input upon detection of the user speaking the input. In the illustrated example, the NMD 103d of the playback device 102d in the Living Room may capture the voice input of a user in its vicinity. In some instances, other network microphone devices (e.g., the NMDs 103f and 103i) in the vicinity of the voice input source (e.g., the user) may also detect the voice input. In such instances, network microphone devices may arbitrate between one another to determine which device(s) should capture and/or process the detected voice input. Examples for selecting and arbitrating between network microphone devices may be found, for example, in U.S. application Ser. No. 15/438,749 filed Feb. 21, 2017, and titled "Voice Control of a Media Playback System," which is incorporated herein by reference in its entirety.

In certain embodiments, a network microphone device may be assigned to a playback device that may not include a network microphone device. For example, the NMD 103f may be assigned to the playback devices 102i and/or 102l in its vicinity. In a related example, a network microphone device may output audio through a playback device to which it is assigned. Additional details regarding associating network microphone devices and playback devices as designated or default devices may be found, for example, in previously referenced U.S. patent application Ser. No. 15/438,749.

In use, the network microphone devices 103 are configured to interact with a voice assistant service VAS, such as a first VAS 160 hosted by one or more of the remote computing devices 106a. For example, as shown in FIG. 1B, the NMD 103f is configured to receive voice input 121 from a user 123. The NMD 103f transmits data associated with the received voice input 121 to the remote computing devices 106a of the first VAS 160, which are configured to (i) process the received voice input data and (ii) transmit a corresponding command to the MPS 100. In some aspects, for example, the remote computing devices 106a comprise one or more modules and/or servers of a VAS (e.g., a VAS operated by one or more of SONOS®, AMAZON®, GOOGLE®, APPLE®, or MICROSOFT®). The remote computing devices 106a can receive the voice input data from the NMD 103f, for example, via the LAN 111 and the router 109. In response to receiving the voice input data, the remote computing devices 106a process the voice input data (i.e., "Play Hey Jude by The Beatles"), and may determine that the processed voice input includes a command to play a song (e.g., "Hey Jude"). In response, one of the computing devices 106a of the first VAS 160 transmits a command to one or more remote computing devices (e.g., remote computing devices 106d) associated with the MPS 100. In this example, the first VAS 160 may transmit a command to the MPS 100 to play back "Hey Jude" by the Beatles. As described below, the MPS 100, in turn, can query a plurality of suitable media content services ("MCS(es)") 167 for media content, such as by sending a request to a first MCS hosted by first one or more remote computing devices 106b and a second MCS hosted by second one or more remote computing devices 106c. In some aspects, for example, the remote computing devices 106b and 106c comprise one or more modules and/or servers of a corresponding MCS (e.g., an MCS operated by one or more of SPOTIFY®, PANDORA®, AMAZON MUSIC®, etc.).

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment as shown in FIG. 1A. For instance, the technologies described herein may be useful in other home environment configurations comprising more or fewer of any of the playback, network microphone, and/or controller devices 102-104. For example, the technologies herein may be utilized within an environment containing a single playback device 102 and/or a single network microphone device 103. In such cases, the LAN 111 may be eliminated and the single playback device 102 and/or the single network microphone device 103 may communicate directly with the remote computing devices 106a-d. In some embodiments, a telecommunication network (e.g., an LTE network, a 5G network) may communicate with the various playback, network microphone, and/or controller devices 102-104 independent of a LAN.

a. Example Playback and Network Microphone Devices

Figure 2A:
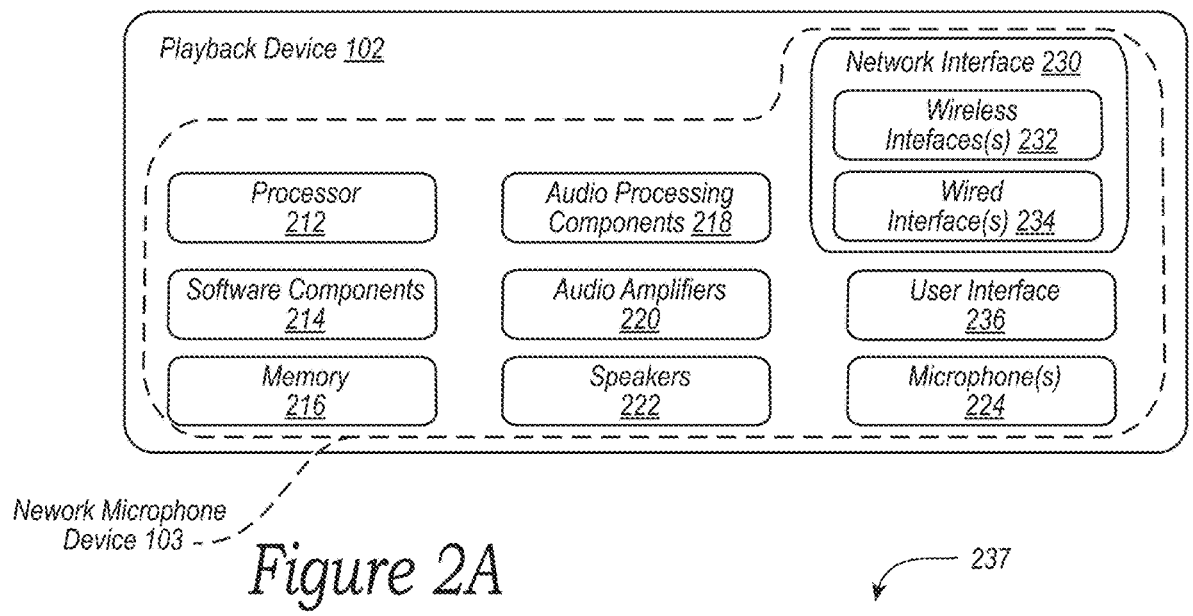
FIG. 2A is a functional block diagram of an example playback device.

FIG. 2A is a functional block diagram illustrating certain aspects of a selected one of the playback devices 102 shown in FIG. 1A. As shown, such a playback device may include a processor 212, software components 214, memory 216, audio processing components 218, audio amplifier(s) 220, speaker(s) 222, and a network interface 230 including wireless interface(s) 232 and wired interface(s) 234. In some embodiments, a playback device may not include the speaker(s) 222, but rather a speaker interface for connecting the playback device to external speakers. In certain embodiments, the playback device may include neither the speaker(s) 222 nor the audio amplifier(s) 222, but rather an audio interface for connecting a playback device to an external audio amplifier or audio-visual receiver.

A playback device may further include a user interface 236. The user interface 236 may facilitate user interactions independent of or in conjunction with one or more of the controller devices 104. In various embodiments, the user interface 236 includes one or more of physical buttons and/or graphical interfaces provided on touch sensitive screen(s) and/or surface(s), among other possibilities, for a user to directly provide input. The user interface 236 may further include one or more of lights and the speaker(s) to provide visual and/or audio feedback to a user.

In some embodiments, the processor 212 may be a clock-driven computing component configured to process input data according to instructions stored in the memory 216. The memory 216 may be a tangible computer-readable medium configured to store instructions executable by the processor 212. For example, the memory 216 may be data storage that can be loaded with one or more of the software components 214 executable by the processor 212 to achieve certain functions. In one example, the functions may involve a playback device retrieving audio data from an audio source or another playback device. In another example, the functions may involve a playback device sending audio data to another device on a network. In yet another example, the functions may involve pairing of a playback device with one or more other playback devices to create a multi-channel audio environment.

Certain functions may involve a playback device synchronizing playback of audio content with one or more other playback devices. During synchronous playback, a listener may not perceive time-delay differences between playback of the audio content by the synchronized playback devices. U.S. Pat. No. 8,234,395 filed Apr. 4, 2004, and titled "System and method for synchronizing operations among a plurality of independently clocked digital data processing devices," which is hereby incorporated by reference in its entirety, provides in more detail some examples for audio playback synchronization among playback devices.

The audio processing components 218 may include one or more digital-to-analog converters (DAC), an audio preprocessing component, an audio enhancement component or a digital signal processor (DSP), and so on. In some embodiments, one or more of the audio processing components 218 may be a subcomponent of the processor 212. In one example, audio content may be processed and/or intentionally altered by the audio processing components 218 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback, the audio processing components 208 may be configured to process audio content to be sent to one or more other playback devices for playback.

Audio content to be processed and/or played back by a playback device may be received from an external source, such as via an audio line-in input connection (e.g., an auto-detecting 3.5 mm audio line-in connection) or the network interface 230.

The network interface 230 may be configured to facilitate a data flow between a playback device and one or more other devices on a data network. As such, a playback device may be configured to receive audio content over the data network from one or more other playback devices in communication with a playback device, network devices within a local area network, or audio content sources over a wide area network such as the Internet. In one example, the audio content and other signals transmitted and received by a playback device may be transmitted in the form of digital packet data containing an Internet Protocol (IP)-based source address and IP-based destination addresses. In such a case, the network interface 230 may be configured to parse the digital packet data such that the data destined for a playback device is properly received and processed by the playback device.

As shown, the network interface 230 may include wireless interface(s) 232 and wired interface(s) 234. The wireless interface(s) 232 may provide network interface functions for a playback device to wirelessly communicate with other devices (e.g., other playback device(s), speaker(s), receiver(s), network device(s), control device(s) within a data network the playback device is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 234 may provide network interface functions for a playback device to communicate over a wired connection with other devices in accordance with a communication protocol (e.g., IEEE 802.3). While the network interface 230 shown in FIG. 2A includes both wireless interface(s) 232 and wired interface(s) 234, the network interface 230 may in some embodiments include only wireless interface(s) or only wired interface(s).

Figure 2B:
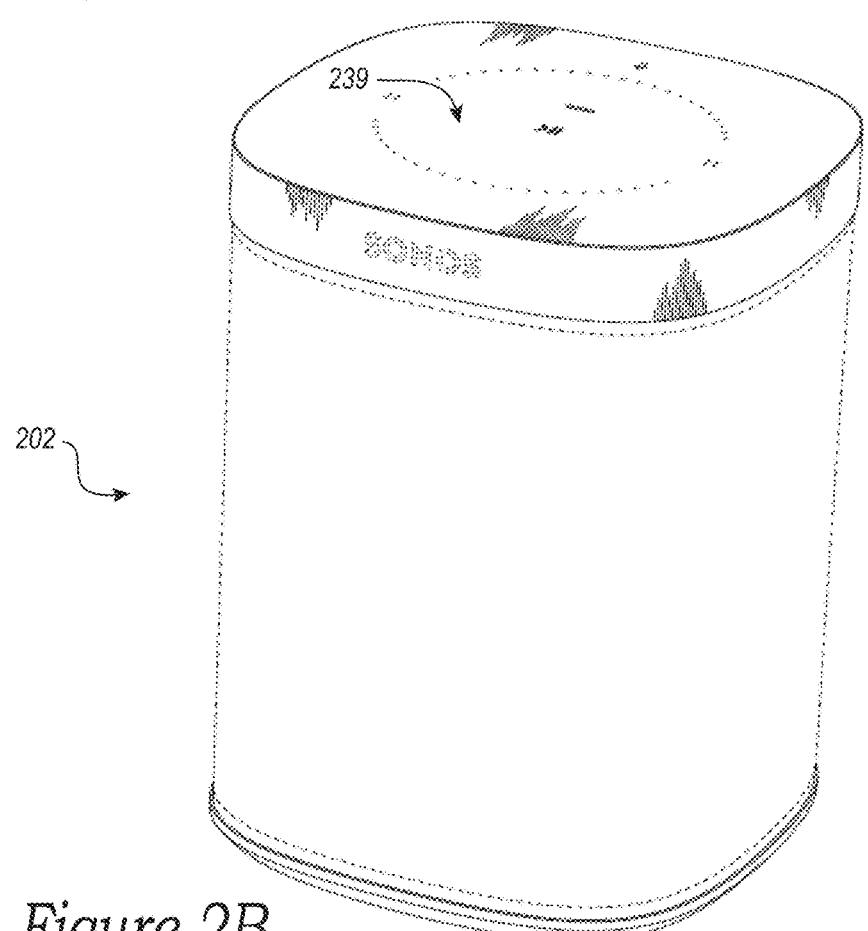
FIG. 2B is an isometric diagram of an example playback device that includes a network microphone device.

As discussed above, a playback device may include a network microphone device, such as one of the NMDs 103 shown in FIG. 1A. A network microphone device may share some or all the components of a playback device, such as the processor 212, the memory 216, the microphone(s) 224, etc. In other examples, a network microphone device includes components that are dedicated exclusively to operational aspects of the network microphone device. For example, a network microphone device may include far-field microphones and/or voice processing components, which in some instances a playback device may not include. In another example, a network microphone device may include a touch-sensitive button for enabling/disabling a microphone. In yet another example, a network microphone device can be a stand-alone device, as discussed above. FIG. 2B is an isometric diagram showing an example playback device 202 incorporating a network microphone device. The playback device 202 has a control area 237 at the top of the device for enabling/disabling microphone(s). The control area 237 is adjacent another area 239 at the top of the device for controlling playback.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2A or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

Figure 3B:
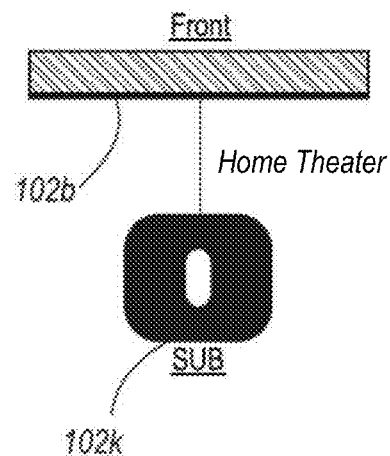
FIGS. 3A-3D are diagrams showing example zones and zone groups in accordance with aspects of the disclosure.
Figure 3A:
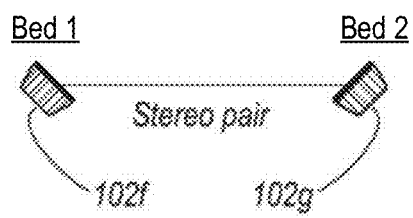
Figure 3C:
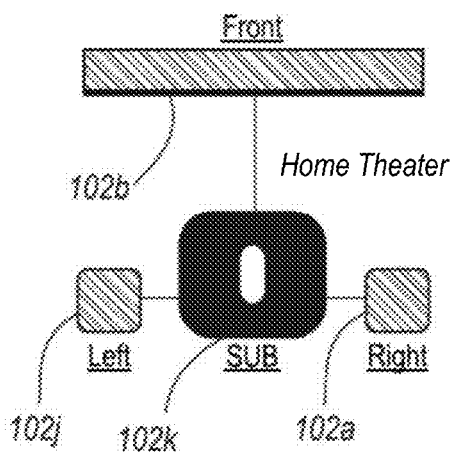
Figure 3D:
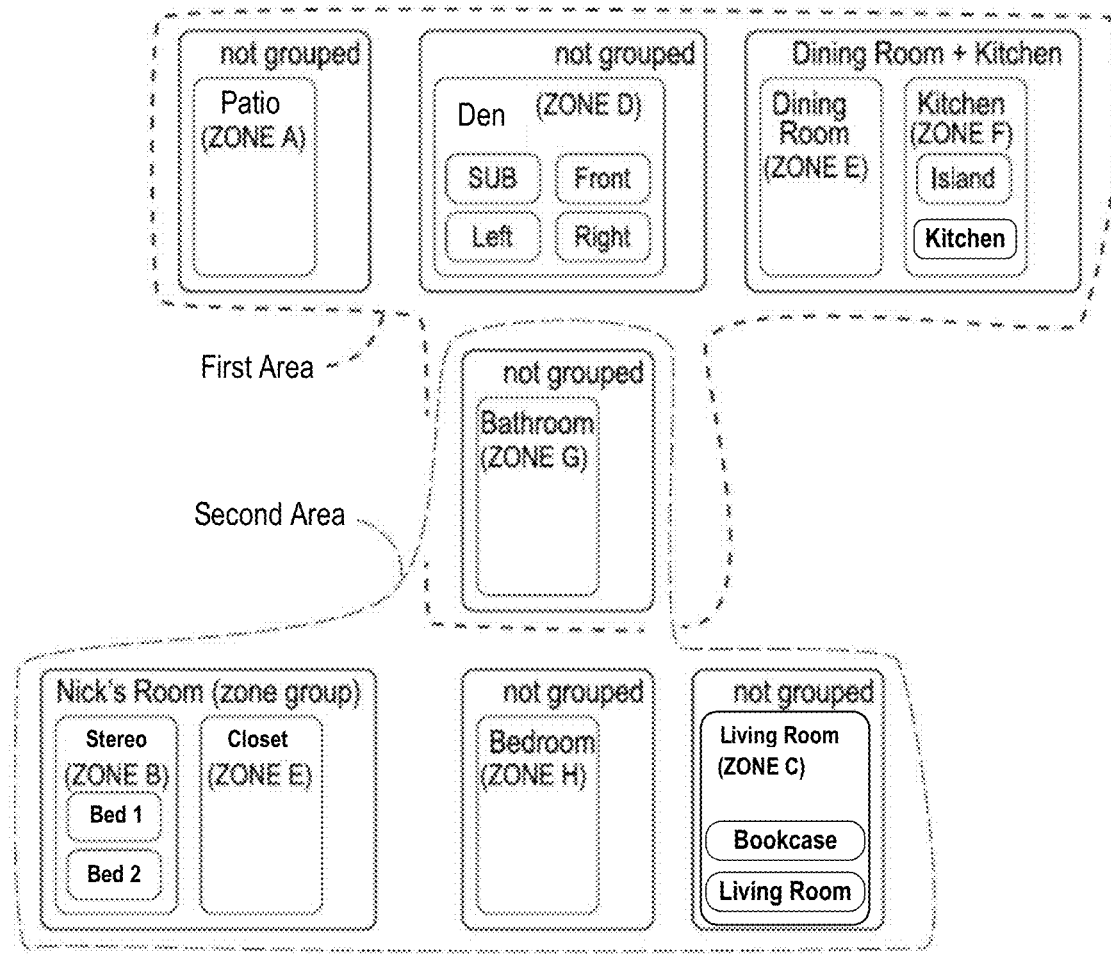

FIGS. 3A-3D show example configurations of playback devices in zones and zone groups. Referring first to FIG. 3D, in one example, a single playback device may belong to a zone. For example, the playback device 102c on the Patio may belong to Zone A. In some implementations described below, multiple playback devices may be "bonded" to form a "bonded pair" which together form a single zone. For example, the playback device 102f (FIG. 1A) named Bed1 in FIG. 3D may be bonded to the playback device 102g (FIG. 1A) named Bed2 in FIG. 3D to form Zone B. Bonded playback devices may have different playback responsibilities (e.g., channel responsibilities).

Each zone in the MPS 100 may be provided for control as a single user interface (UI) entity. For example, Zone A may be provided as a single entity named Patio. Zone C may be provided as a single entity named Living Room. Zone B may be provided as a single entity named Stereo.

In various embodiments, a zone may take on the name of one of the playback device(s) belonging to the zone. For example, Zone C may take on the name of the Living Room device 102m (as shown). In another example, Zone C may take on the name of the Bookcase device 102d. In a further example, Zone C may take on a name that is some combination of the Bookcase device 102d and Living Room device 102m. The name that is chosen may be selected by user. In some embodiments, a zone may be given a name that is different than the device(s) belonging to the zone. For example, Zone B is named Stereo but none of the devices in Zone B have this name.

Playback devices that are bonded may have different playback responsibilities, such as responsibilities for certain audio channels. For example, as shown in FIG. 3A, the Bed1 and Bed2 devices 102f and 102g may be bonded so as to produce or enhance a stereo effect of audio content. In this example, the Bed1 playback device 102f may be configured to play a left channel audio component, while the Bed2 playback device 102g may be configured to play a right channel audio component. In some implementations, such stereo bonding may be referred to as "pairing."

Additionally, bonded playback devices may have additional and/or different respective speaker drivers. As shown in FIG. 3B, the playback device 102b named Front may be bonded with the playback device 102k named SUB. The Front device 102b may render a range of mid to high frequencies and the SUB device 102k may render low frequencies as, e.g., a subwoofer. When unbonded, the Front device 102b may render a full range of frequencies. As another example, FIG. 3C shows the Front and SUB devices 102b and 102k further bonded with Right and Left playback devices 102a and 102k, respectively. In some implementations, the Right and Left devices 102a and 102k may form surround or "satellite" channels of a home theater system. The bonded playback devices 102a, 102b, 102j, and 102k may form a single Zone D (FIG. 3D).

Figure 3F:
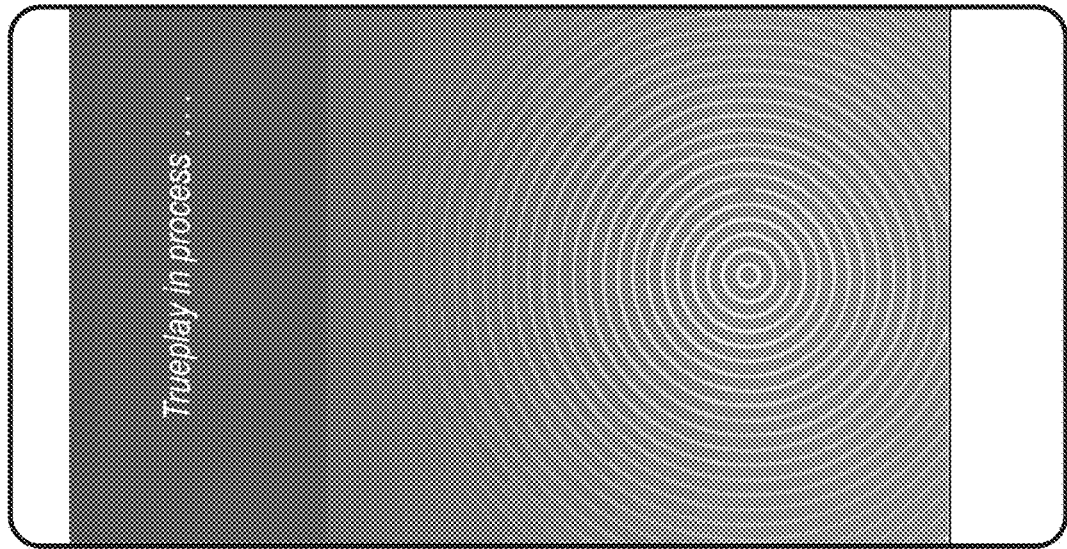
FIGS. 3E and 3F are diagrams showing example voice inputs for calibrating a bonded stereo pair of playback devices in accordance with aspects of the disclosure.
Figure 3E:
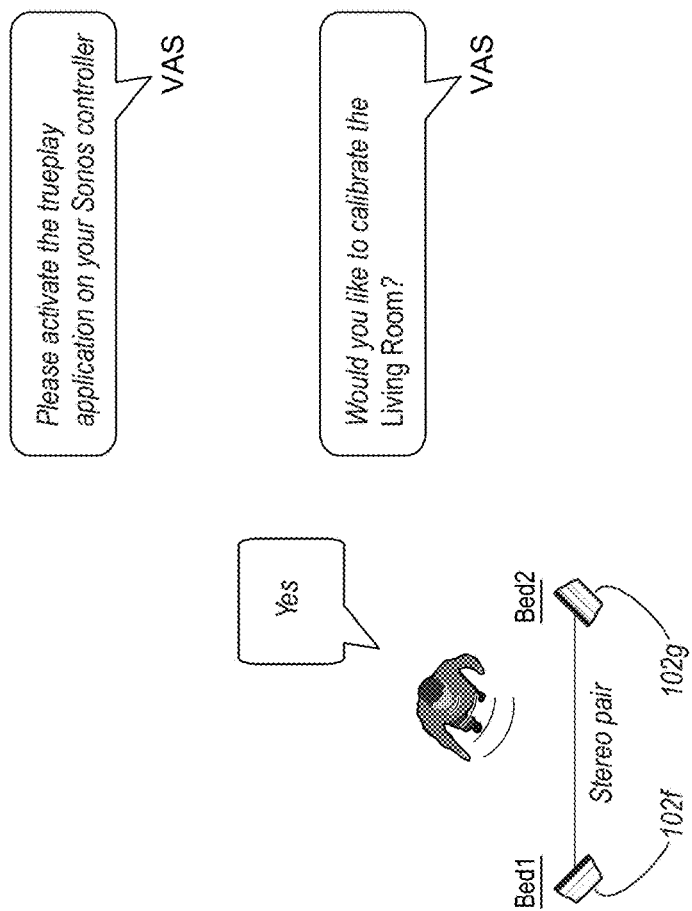

In some embodiments, playback devices in a bonded zone can be calibrated together and concurrently, rather than separately. For example, calibration software, such as SONOS's TRUEPLAY® can be used to calibrate a bonded zone together as a single entity. This is in contrast to playback devices that are merely grouped together, which may be calibrated either before or after formation of the group. In related embodiments, bonding playback devices can cause the MPS 100 and/or the VAS 160 to initiate multi-turn or other commands for calibrating playback devices, as shown in FIGS. 3E and 3F. In one example, after the Bed1 and Bed 2 playback devices 102f and 102g have been bonded to form a stereo pair, the MPS 100 or the VAS 160 may initiate calibration. For example, the VAS 160 may ready 3F software, such as SONOS' TRUEPLAY® software for calibration, as shown in FIG. 3F.

In some embodiments, a stand-alone network microphone device may be in a zone by itself. For example, the NMD 103h in FIG. 1A is named Closet and forms Zone E. A network microphone device may also be bonded or merged with another device so as to form a zone. For example, the NMD device 103f named Island may be bonded with the playback device 102i Kitchen, which together form Zone G, which is also named Kitchen. Additional details regarding associating network microphone devices and playback devices as designated or default devices may be found, for example, in previously referenced U.S. patent application Ser. No. 15/438,749. In some embodiments, a stand-alone network microphone device may not be associated with a zone.

Zones of individual, bonded, and/or merged devices may be grouped to form a zone group. For example, referring to FIG. 3D, Zone A may be grouped with Zone B to form a zone group that includes the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group, such as Dining Room+Kitchen, as shown in FIG. 3D. In some embodiments, a zone group may be given a unique name selected by a user, such as Nick's Room, as also shown in FIG. 3D.

Referring again to FIG. 2A, certain data may be stored in the memory 216 as one or more state variables that are periodically updated and used to describe the state of a playback zone, the playback device(s), and/or a zone group associated therewith. The memory 216 may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3. An area may involve a cluster of zone groups and/or zones not within a zone group. For instance, FIG. 3D shows a first area named First Area and a second area named Second Area. The First Area includes zones and zone groups of the Patio, Den, Dining Room, Kitchen, and Bathroom. The Second Area includes zones and zone groups of the Bathroom, Nick's Room, the Bedroom, and the Living Room. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 216 may be further configured to store other data. Such data may pertain to audio sources accessible by a playback device or a playback queue that the playback device (or some other playback device(s)) may be associated with. In embodiments described below, the memory 216 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102c while another user may be preparing food in the Kitchen zone and listening to classical music being played by the playback device 102i. In another example, a playback zone may play the same audio content in synchrony with another playback zone. For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the use may pair or group the moved playback device 102c with the Office zone and/or rename the players in the Office zone using, e.g., one of the controller devices 104 and/or voice input. As another example, if one or more playback devices 102 are moved to a particular area in the home environment that is not already a playback zone, the moved playback device(s) may be renamed or associated with a playback zone for the particular area.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices 102 in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may implement either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs

103 may be configured to control the various playback and other devices of the MPS 100.

c. Example Controller Devices

Figure 4:
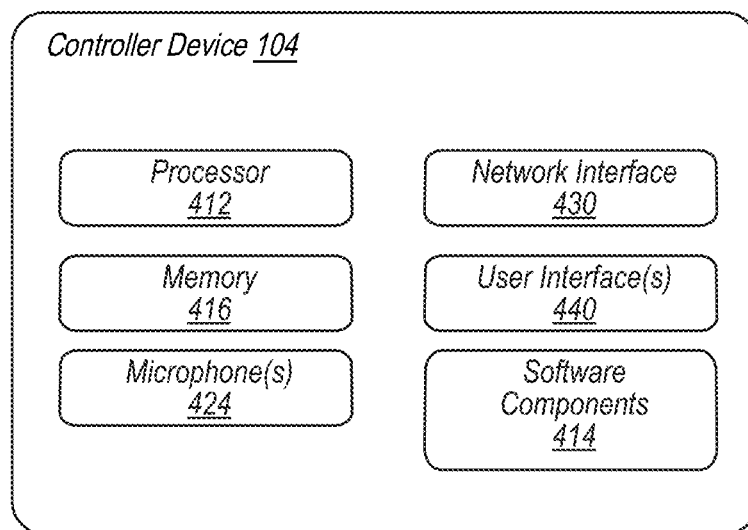
FIG. 4 is a functional block diagram of an example controller device in accordance with aspects of the disclosure.

FIG. 4 is a functional block diagram illustrating certain aspects of a selected one of the controller devices 104 of the MPS 100 of FIG. 1A. Such controller devices may also be referred to as a controller. The controller device shown in FIG. 4 may include components that are generally similar to certain components of the network devices described above, such as a processor 412, memory 416, microphone(s) 424, and a network interface 430. In one example, a controller device may be a dedicated controller for the MPS 100. In another example, a controller device may be a network device on which media playback system controller application software may be installed, such as for example, an iPhone™, iPad™ or any other smart phone, tablet or network device (e.g., a networked computer such as a PC or Mac™).

The memory 416 of a controller device may be configured to store controller application software and other data associated with the MPS 100 and a user of the system 100. The memory 416 may be loaded with one or more software components 414 executable by the processor 412 to achieve certain functions, such as facilitating user access, control, and configuration of the MPS 100. A controller device communicates with other network devices over the network interface 430, such as a wireless interface, as described above.

In one example, data and information (e.g., such as a state variable) may be communicated between a controller device and other devices via the network interface 430. For instance, playback zone and zone group configurations in the MPS 100 may be received by a controller device from a playback device, a network microphone device, or another network device, or transmitted by the controller device to another playback device or network device via the network interface 406. In some cases, the other network device may be another controller device.

Playback device control commands such as volume control and audio playback control may also be communicated from a controller device to a playback device via the network interface 430. As suggested above, changes to configurations of the MPS 100 may also be performed by a user using the controller device. The configuration changes may include adding/removing one or more playback devices to/from a zone, adding/removing one or more zones to/from a zone group, forming a bonded or merged player, separating one or more playback devices from a bonded or merged player, among others.

Figures 4A, 4B:
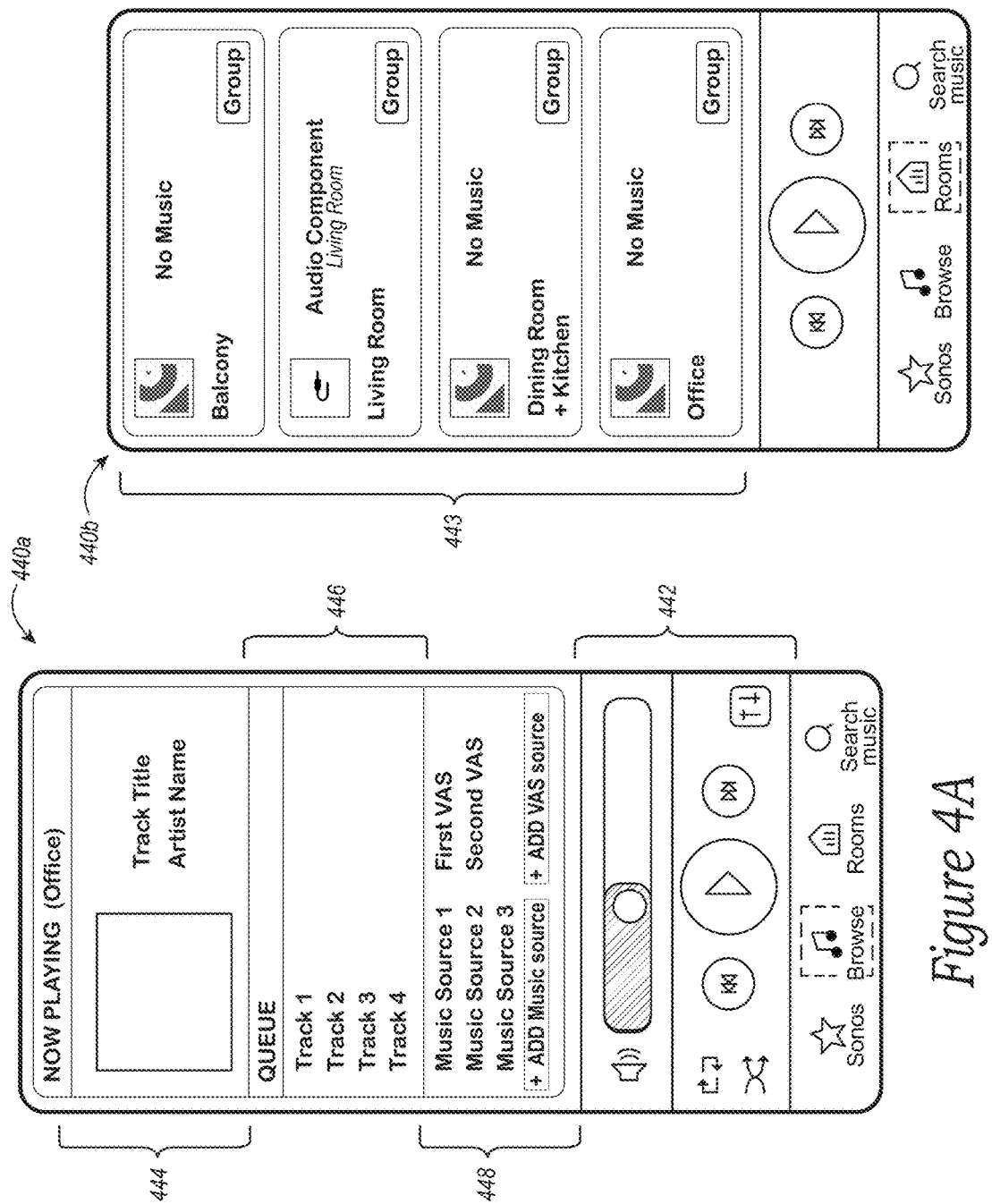
FIGS. 4A and 4B are controller interfaces in accordance with aspects of the disclosure.

The user interface(s) 440 of a controller device may be configured to facilitate user access and control of the MPS 100, by providing controller interface(s) such as the controller interfaces 440a and 440b shown in FIGS. 4A and 4B, respectively, which may be referred to collectively as the controller interface 440. Referring to FIGS. 4A and 4B together, the controller interface 440 includes a playback control region 442, a playback zone region 443, a playback status region 444, a playback queue region 446, and a sources region 448. The user interface 400 as shown is just one example of a user interface that may be provided on a network device such as the controller device shown in FIG. 4 and accessed by users to control a media playback system such as the MPS 100. Other user interfaces of varying formats, styles, and interactive sequences may alternatively be implemented on one or more network devices to provide comparable control access to a media playback system.

The playback control region 442 (FIG. 4A) may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 442 may also include selectable icons to modify equalization settings, and playback volume, among other possibilities.

The playback zone region 443 (FIG. 4B) may include representations of playback zones within the MPS 100. The playback zones regions may also include representation of zone groups, such as the Dining Room+Kitchen zone group, as shown. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 443 (FIG. 4B) may be dynamically updated as playback zone or zone group configurations are modified.

The playback status region 444 (FIG. 4A) may include graphical representations of audio content that is presently being played, previously played, or scheduled to play next in the selected playback zone or zone group. The selected playback zone or zone group may be visually distinguished on the user interface, such as within the playback zone region 443 and/or the playback status region 444. The graphical representations may include track title, artist name, album name, album year, track length, and other relevant information that may be useful for the user to know when controlling the media playback system via the user interface 440.

The playback queue region 446 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

With reference still to FIGS. 4A and 4B, the graphical representations of audio content in the playback queue region 446 (FIG. 4B) may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and selectable voice assistants associated with a corresponding VAS. As described in more detail below with respect to FIGS. 8-11, the VAS(es) may be selectively assigned. In some examples, multiple VAS(es), such as AMAZON's Alexa®, MICROSOFT's Cortana®, etc., may be invokable by the same network microphone device. In some embodiments, a user may assign a VAS exclusively to one or more network microphone devices. For example, a user may assign a first VAS to one or both of the NMDs 102*a* and 102*b* in the Living Room shown in FIG. 1, and a second VAS to the NMD 103*f* in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (such as a controller device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the MPS 100 of FIG. 1A. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Network Microphone Devices

Figure 5A:
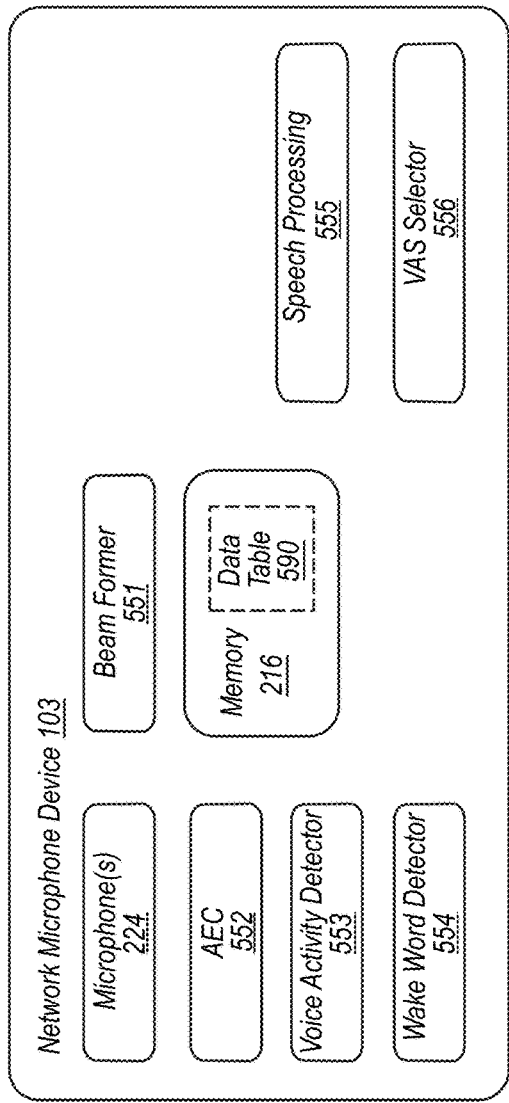
FIG. 5A is a functional block diagram of an example network microphone device in accordance with aspects of the disclosure.

FIG. 5A is a functional block diagram showing additional features of one or more of the NMDs 103 in accordance with aspects of the disclosure. The network microphone device shown in FIG. 5A may include components that are generally similar to certain components of network microphone devices described above, such as the processor 212 (FIG. 2A), network interface 230 (FIG. 2A), microphone(s) 224, and the memory 216. Although not shown for purposes of clarity, a network microphone device may include other components, such as speakers, amplifiers, signal processors, as discussed above.

The microphone(s) 224 may be a plurality of microphones arranged to detect sound in the environment of the network microphone device. In one example, the microphone(s) 224 may be arranged to detect audio from one or more directions relative to the network microphone device. The microphone(s) 224 may be sensitive to a portion of a frequency range. In one example, a first subset of the microphone(s) 224 may be sensitive to a first frequency range, while a second subset of the microphone(s) 224 may be sensitive to a second frequency range. The microphone(s) 224 may further be arranged to capture location information of an audio source (e.g., voice, audible sound) and/or to assist in filtering background noise. Notably, in some embodiments the microphone(s) 224 may have a single microphone rather than a plurality of microphones.

A network microphone device may further include beam former components 551, acoustic echo cancellation (AEC) components 552, voice activity detector components 553, and/or wake word detector components 554. In various embodiments, one or more of the components 551-556 may be a subcomponent of the processor 512.

The beamforming and AEC components 551 and 552 are configured to detect an audio signal and determine aspects of voice input within the detect audio, such as the direction, amplitude, frequency spectrum, etc. For example, the beamforming and AEC components 551 and 552 may be used in a process to determine an approximate distance between a network microphone device and a user speaking to the network microphone device. In another example, a network microphone device may detective a relative proximity of a user to another network microphone device in a media playback system.

The voice activity detector activity components 553 are configured to work closely with the beamforming and AEC components 551 and 552 to capture sound from directions where voice activity is detected. Potential speech directions can be identified by monitoring metrics which distinguish speech from other sounds. Such metrics can include, for example, energy within the speech band relative to background noise and entropy within the speech band, which is measure of spectral structure. Speech typically has a lower entropy than most common background noise.

The wake-word detector components 554 are configured to monitor and analyze received audio to determine if any wake words are present in the audio. The wake-word detector components 554 may analyze the received audio using a wake word detection algorithm. If the wake-word detector 554 detects a wake word, a network microphone device may process voice input contained in the received audio. Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wake-words.

In some embodiments, the wake word detector 554 runs multiple wake word detections algorithms on the received audio simultaneously (or substantially simultaneously). As noted above, different voice services (e.g. AMAZON's Alexa®, APPLE's Siri®, MICROSOFT's Cortana®, GOOGLE'S Assistant, etc.) each use a different wake word for invoking their respective voice service. To support multiple services, the wake word detector 554 may run the received audio through the wake word detection algorithm for each supported voice service in parallel. In such embodiments, the network microphone device 103 may include VAS selector components 556 configured to pass voice input to the appropriate voice assistant service. In other embodiments, the VAS selector components 556 may be omitted. In some embodiments, individual NMDs 103 of the MPS 100 may be configured to run different wake word detection algorithms associated with particular VASes. For example, the NMDs of playback devices 102a and 102b of the Living Room may be associated with AMAZON's ALEXA®, and be configured to run a corresponding wake word detection algorithm (e.g., configured to detect the wake word "Alexa" or other associated wake word), while the NMD of playback device 102f in the Kitchen may be associated with GOOGLE's Assistant, and be configured to run a corresponding wake word detection algorithm (e.g., configured to detect the wake word "OK, Google" or other associated wake word).

In some embodiments, a network microphone device may include speech processing components 555 configured to further facilitate voice processing, such as by performing voice recognition trained to recognize a particular user or a particular set of users associated with a household. Voice recognition software may implement voice-processing algorithms that are tuned to specific voice profile(s).

In some embodiments, one or more of the components 551-556 described above can operate in conjunction with the microphone(s) 224 to detect and store a user's voice profile, which may be associated with a user account of the MPS 100. In some embodiments, voice profiles may be stored as and/or compared to variables stored in the set of command information, or data table 590, as shown in FIG. 5A. The voice profile may include aspects of the tone or frequency of user's voice and/or other unique aspects of the user such as those described in previously referenced U.S. patent application Ser. No. 15/438,749.

In some embodiments, one or more of the components 551-556 described above can operate in conjunction with the microphone array 524 to determine the location of a user in the home environment and/or relative to a location of one or more of the NMDs 103. Techniques for determining the location or proximity of a user may include or more techniques disclosed in previously referenced U.S. patent application Ser. No. 15/438,749, U.S. Pat. No. 9,084,058 filed Dec. 29, 2011, and titled "Sound Field Calibration Using Listener Localization," and U.S. Pat. No. 8,965,033 filed Aug. 31, 2012, and titled "Acoustic Optimization." Each of these applications is incorporated herein by reference in its entirety.

Figure 5B:
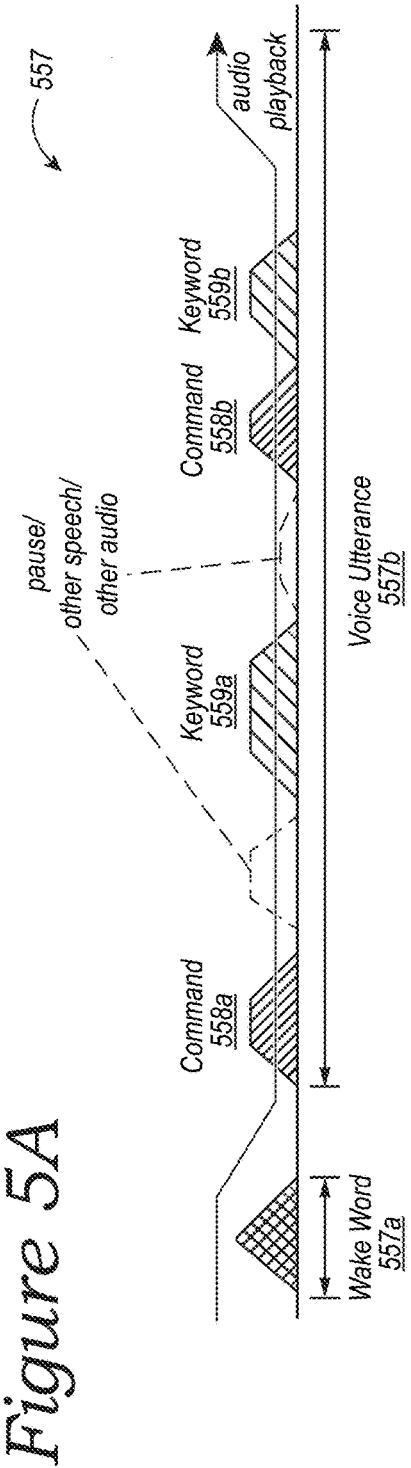
FIG. 5B is a diagram of an example voice input in accordance with aspects of the disclosure.

FIG. 5B is a diagram of an example voice input in accordance with aspects of the disclosure. The voice input may be captured by a network microphone device, such as by one or more of the NMDs 103 shown in FIG. 1A. The voice input may include a wake word portion 557a and a voice utterance portion 557b (collectively "voice input 557"). In some embodiments, the wake word 557a can be a known wake word, such as "Alexa," which is associated with AMAZON's Alexa®. In other embodiments, the voice input 557 may not include a wake word.

In some embodiments, a network microphone device may output an audible and/or visible response upon detection of the wake word portion 557a. In addition or alternately, a network microphone device may output an audible and/or visible response after processing a voice input and/or a series of voice inputs (e.g., in the case of a multi-turn request).

The voice utterance portion 557b of the voice input 557 may include, for example, one or more spoken commands 558 (identified individually as a first command 558a and a second command 558b) and one or more spoken keywords 559 (identified individually as a first keyword 559a and a second keyword 559b). A keyword may be, for example, a word in the voice input identifying a particular device or group in the MPS 100. As used herein, the term "keyword" may refer to a single word (e.g., "Bedroom") or a group of words (e.g., "the Living Room"). In one example, the first command 557a can be a command to play music, such as a specific song, album, playlist, etc. In this example, the keywords 559 may be one or more words identifying one or more zones in which the music is to be played, such as the Living Room and the Dining Room (FIG. 1A). In some examples, the voice utterance portion 557*b* can include other information, such as detected pauses (e.g., periods of non-speech) between words spoken by a user, as shown in FIG. 5B. The pauses may demarcate the locations of separate commands, keywords, or other information spoke by the user within the voice utterance portion 557*b*.

In some embodiments, the MPS 100 is configured to temporarily reduce the volume of audio content that it is playing while detecting the wake word portion 557*a*. The MPS 100 may restore the volume after processing the voice input 557, as shown in FIG. 5B. Such a process can be referred to as ducking, examples of which are disclosed in previously referenced U.S. patent application Ser. No. 15/438,749.

f. Example Network and Remote Computing Systems

Figure 6:
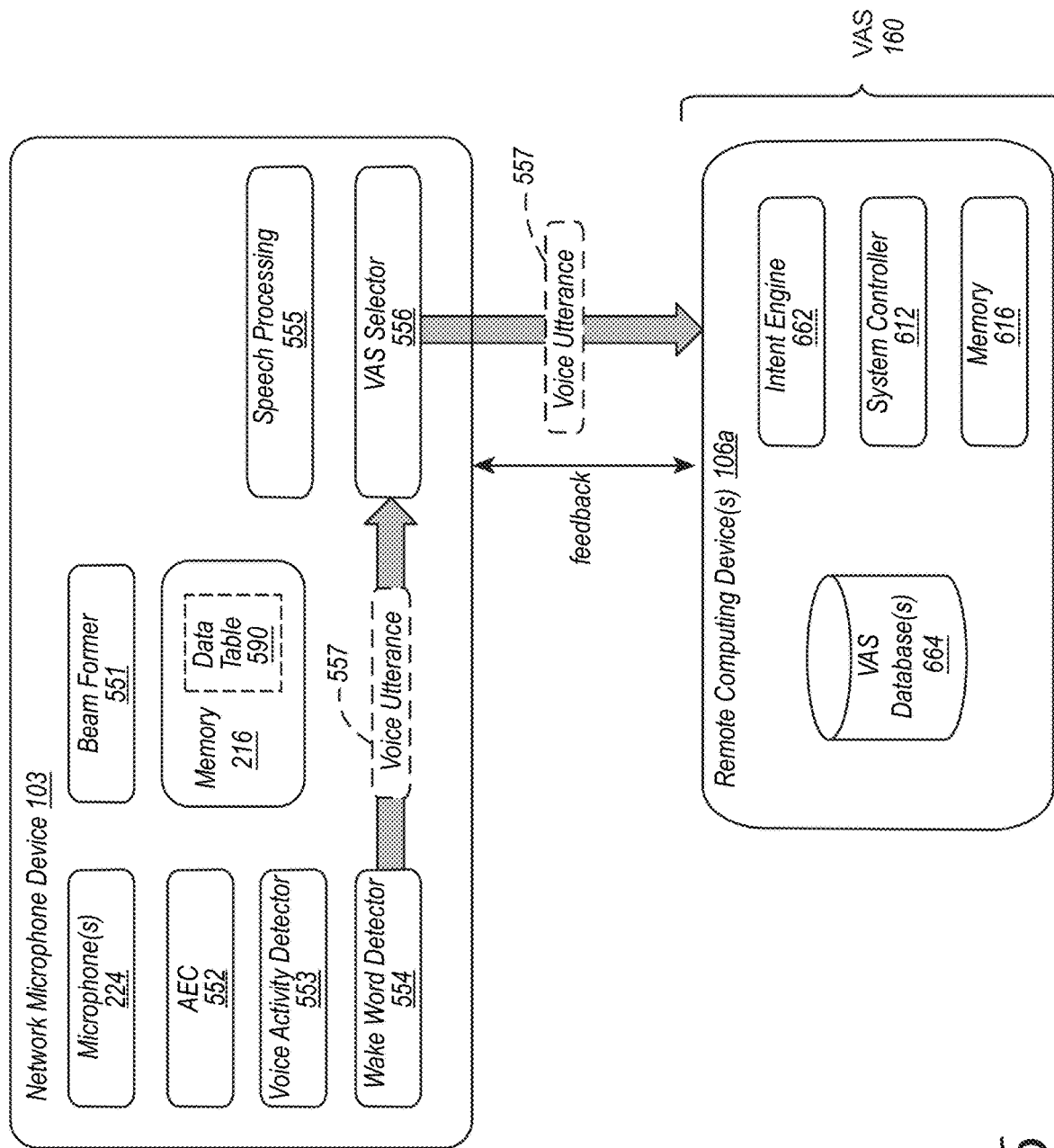
FIG. 6 is a functional block diagram of example remote computing device(s) in accordance with aspects of the disclosure.

As discussed above, the MPS 100 may be configured to communicate with one or more remote computing devices (e.g., cloud servers) associated with one or more VAS(es). FIG. 6 is a functional block diagram showing an example remote computing device(s) associated with an example VAS configured to communicate with the MPS 100. As shown in FIG. 6, in various embodiments one or more of the NMDs 103 may send voice inputs over a WAN 107 to the one or more remote computing device(s) associated with the one or more VAS(es). For purposes of illustration, selected communication paths of the voice input 557 are represented by arrows in FIG. 6. In some embodiments, the one or more NMDs 103 only send the voice utterance portion 557*b* (FIG. 5B) of the voice input 557 to the remote computing device(s) associated with the one or more VAS(es) (and not the wake word portion 557*a*). In some embodiments, the one or more NMDs 103 send both the voice utterance portion 557*b* and the wake word portion 557*a* (FIG. 5B) to the remote computing device(s) associated with the one or more VAS(es).

As shown in FIG. 6, the remote computing device(s) associated with the VAS(es) may include a memory 616, an intent engine 662, and a system controller 612 comprising one or more processors. In some embodiments, the intent engine 662 is a subcomponent of the system controller 612. The memory 616 may be a tangible computer-readable medium configured to store instructions executable by the system controller 612 and/or one or more of the playback devices, NMDs, and/or controller devices 102-104.

The intent engine 662 may receive a voice input from the MPS 100 after it has been converted to text by a speech-to-text engine (not shown). In some embodiments, the speech-to-text engine is a component that is onboard the remote computing device(s) associated with the particular VAS. The speech-to-text engine may additionally or alternatively be located at or distributed across one or more other computing devices, such as the one or more remote computing devices 106*d* (FIG. 1B) and/or the one or more of the local network devices (e.g., one or more of the playback devices, the NMDs, and/or the controller devices 102-104) of the MPS 100.

Upon receiving the voice input 557 from the MPS 100, the intent engine 662 processes the voice input 557 and determines an intent of the voice input 557. While processing the voice input 557, the intent engine 662 may determine if certain command criteria are met for particular command(s) detected in the voice input 557. Command criteria for a given command in a voice input may be based, for example, on the inclusion of certain keywords within the voice input. In addition or alternately, command criteria for given command(s) may involve detection of one or more control state and/or zone state variables in conjunction with detecting the given command(s). Control state variables may include, for example, indicators identifying a level of volume, a queue associated with one or more device(s), and playback state, such as whether devices are playing a queue, paused, etc. Zone state variables may include, for example, indicators identifying which, if any, zone players are grouped. The command information may be stored in memory of e.g., the databases 664 and/or the memory 216 of the one or more network microphone devices.

In some embodiments, the intent engine 662 is in communication with one or more database(s) 664 associated with the selected VAS and/or one or more database(s) of the MPS 100. The VAS database(s) 664 and/or database(s) of the MPS 100 may store various user data, analytics, catalogs, and other information for NLU-related and/or other processing. The VAS database(s) 664 may reside in the memory 616 of the remote computing device(s) associated with the VAS or elsewhere, such as in memory of one or more of the remote computing devices 106*d* and/or local network devices (e.g., the playback devices, NMDs, and/or controller devices 102-104) of the MPS 100 (FIG. 1A). Likewise, the media playback system database(s) may reside in the memory of the remote computing device(s) and/or local network devices (e.g., the playback devices, NMDs, and/or controller devices 102-104) of the MPS 100 (FIG. 1A). In some embodiments, the VAS database(s) 664 and/or database(s) associated with the MPS 100 may be updated for adaptive learning and feedback based on the voice input processing.

The various local network devices 102-105 (FIG. 1A) and/or remote computing devices 106*d* of the MPS 100 may exchange various feedback, information, instructions, and/or related data with the remote computing device(s) associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in previously referenced U.S. patent application Ser. No. 15/438,749.

Figure 7:
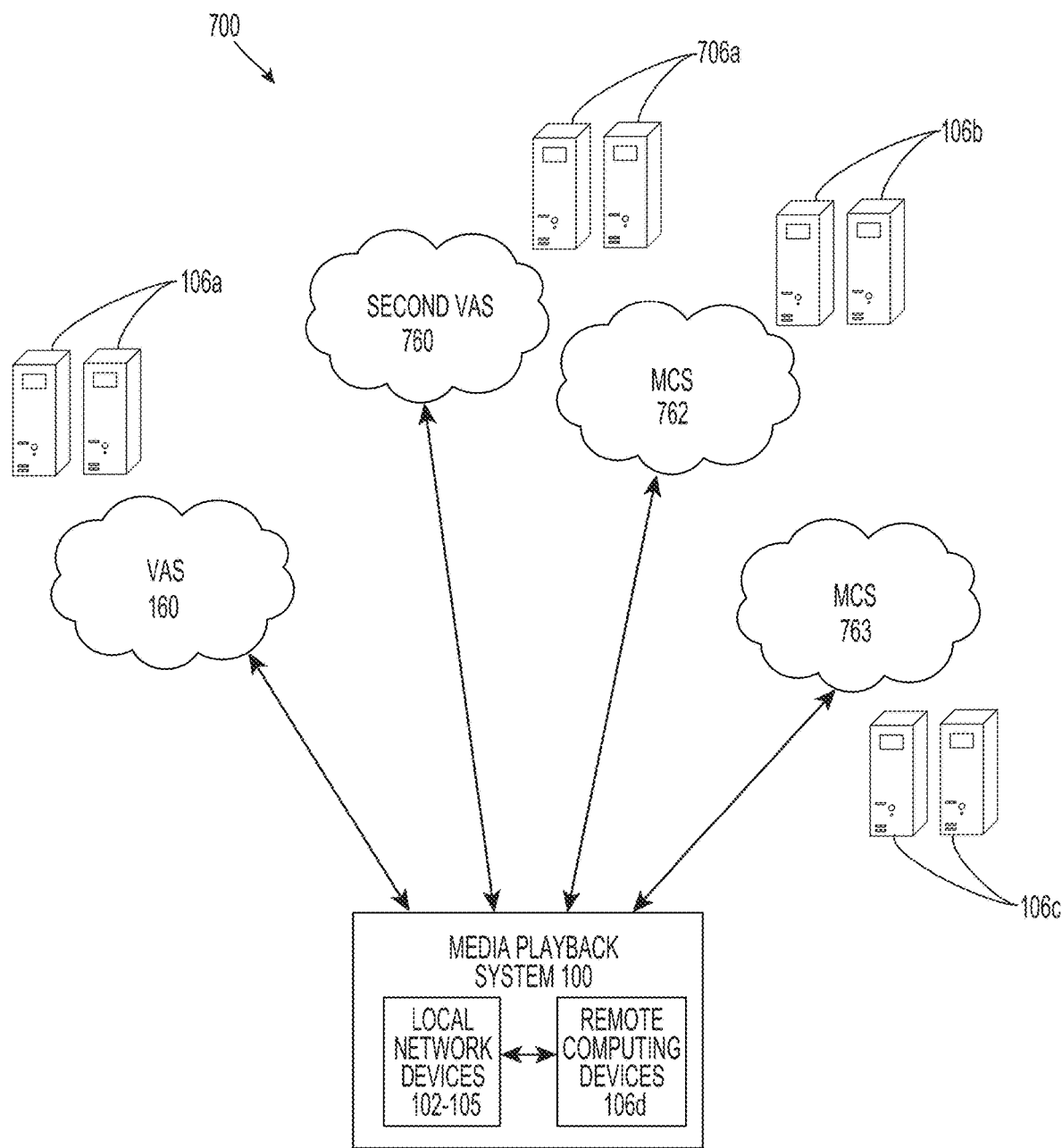
FIG. 7 is a schematic diagram of an example network system in accordance with aspects of the disclosure.

FIG. 7 depicts an example network system 700 in which a voice-assisted media content selection process is performed. The network system 700 comprises the MPS 100 coupled to: (i) the first VAS 160 and associated remote computing devices 106*a*; (ii) one or more second VAS(es) 760, each hosted by one or more corresponding remote computing devices 706*a*, and (iii) a plurality of MCS(es) 167, such as a first media content service 762 (or "MCS 762") hosted by one or more corresponding remote computing devices 106*b*, and a second media content service 763 (or "MCS 763") hosted by one or more corresponding remote computing devices 106*c*. In some embodiments, the MPS 100 may be coupled to more or fewer VASes (e.g., one VAS, three VASes, four VASes, five VASes, six VASes, etc.) and/or more or fewer media content services (e.g., one MCS, three MCSes, four MCSes, five MCSes, six MCSes, etc.).

As noted previously, in some embodiments, individual playback devices of the MPS 100 can be coupled to or associated with the first VAS 160 while other playback devices may be coupled to or associated with the second VAS 760. For example, a first playback device of the MPS 100 can be configured to detect a first wake word associated with first VAS 160 (e.g., "OK, Google" for GOOGLE's Assistant). Following detection of the first wake word, the first playback device can transmit a voice utterance to the first VAS 160 for further processing. Meanwhile, a second playback device of the MPS 100 can be configured to detect a second wake word associated with the second VAS 760 (e.g., "Alexa" for AMAZON's ALEXA). Following detection of the second wake word, the second playback device can transmit a voice utterance to the second VAS 760 for processing. As a result, the MPS 100 can enable a user to interact via voice-control with multiple different VASes.

The MPS 100 may be coupled to the VAS(es) 160, 760 and/or the first and second MCSes 762, 763 (and/or their associated remote computing devices 106a, 706a, 106b, and 106c) via a WAN and/or a LAN 111 connected to the WAN 107 and/or one or more routers 109 (FIG. 1B). In this way, the various local network devices 102-105 of the MPS 100 and/or the one or more remote computing devices 106d of the MPS 100 may communicate with the remote computing device(s) of the VAS(es) 160, 760 and the MCSes 762, 763.

In some embodiments, the MPS 100 may be configured to concurrently communicate with both the MCSes 167 and/or the VAS(es) 160, 760. For example, the MPS 100 may transmit search requests for particular content to both the first and second MCS(es) 762, 763 in parallel, and may send voice input data to one or more of the VAS(es) 160, 760 in parallel.

III. Example Systems and Methods for Associating Playback Devices with Voice Assistant Services FIG. 8 (including FIGS. 8A-8H) shows an example process flow for associating a voice assistant service (VAS) with one or more playback devices. As noted above, example VASes include AMAZON's ALEXA, GOOGLE's Assistant, APPLE's SIRI, MICROSOFT's CORTANA, etc. A VAS may be a remote service implemented by cloud servers to process voice inputs and perform certain actions in response. In some embodiments, a VAS can communicate with a playback device 102 via an integrated network microphone device 103. In other embodiments, a VAS can communicate with a separate microphone device (e.g., GOOGLE HOME, AMAZON's ECHO DOT, etc.) which in turn communicates with the playback device 102.

Figure 8:
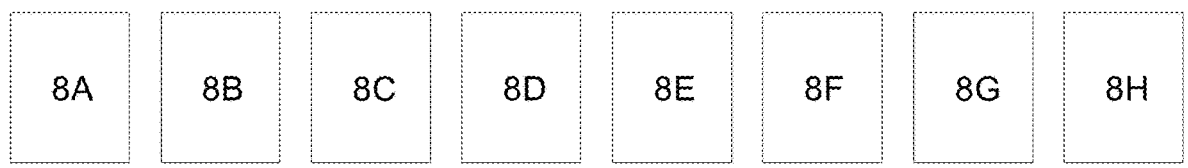
FIG. 8 (including FIGS. 8A-8H) is an example process flow for associating a voice assistant service with one or more playback devices of media playback system in accordance with aspects of the disclosure.

In the process flow illustrated in FIG. 8, a user can associate a first VAS (referred to in FIG. 8 as "VAS1") with one or more playback devices. This association can be established for either playback devices that include an integrated network microphone device, or for playback devices that do not include an integrated network microphone device, but that are coupled with a separate network microphone device (e.g., the playback device is in communication with the separate network microphone device over the LAN 111 (FIG. 1B)). Several of the steps illustrated in FIG. 8 can be performed via a control device 104 (FIG. 4) (for example, the graphical images can be displayed, and user input can be received, via user interface(s) 440). As described below, certain steps can be performed through a software control application running on a smartphone, tablet, or computer that is associated with the media playback system ("the MPS app"), while other steps can be performed through a separate software control application running on a smartphone, tablet, or computer that is associated with the first VAS ("the VAS1 app").

Figure 8A:
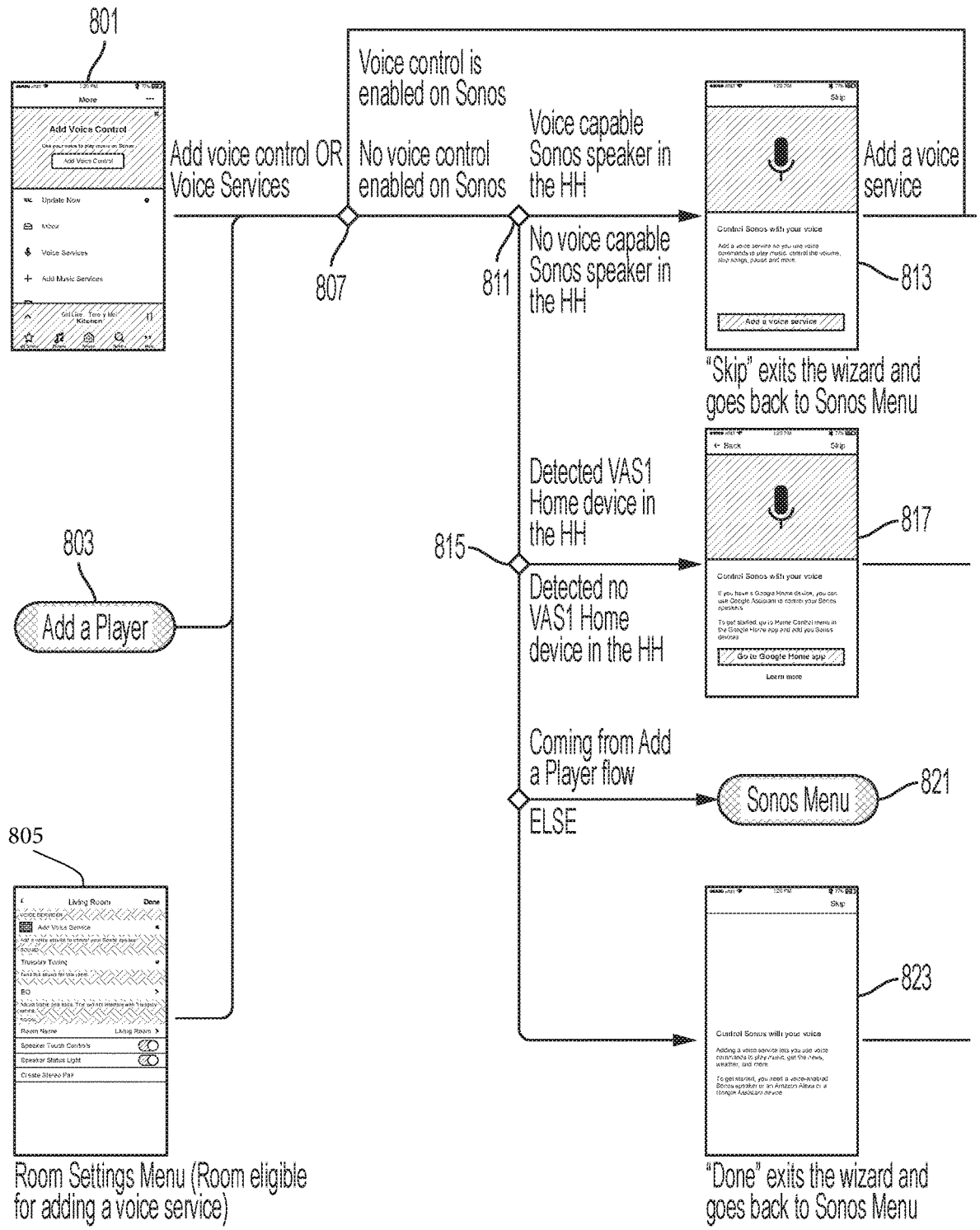

Referring to FIG. 8A, the process may begin in any one of three different stages. In interface 801, the user has the option to select "Add Voice Control" via the MPS app. In stage 803, the user may initiate the process by adding a new playback device to the MPS 100 (which may also be initiated via the MPS app). At interface 805, the user may select "Add Voice Service" via a Settings screen of the MPS app. Through either interfaces 801 or 805, or through selecting "Add a Player" at stage 803, the process 800 continues to decision block 807.

Figure 8B:
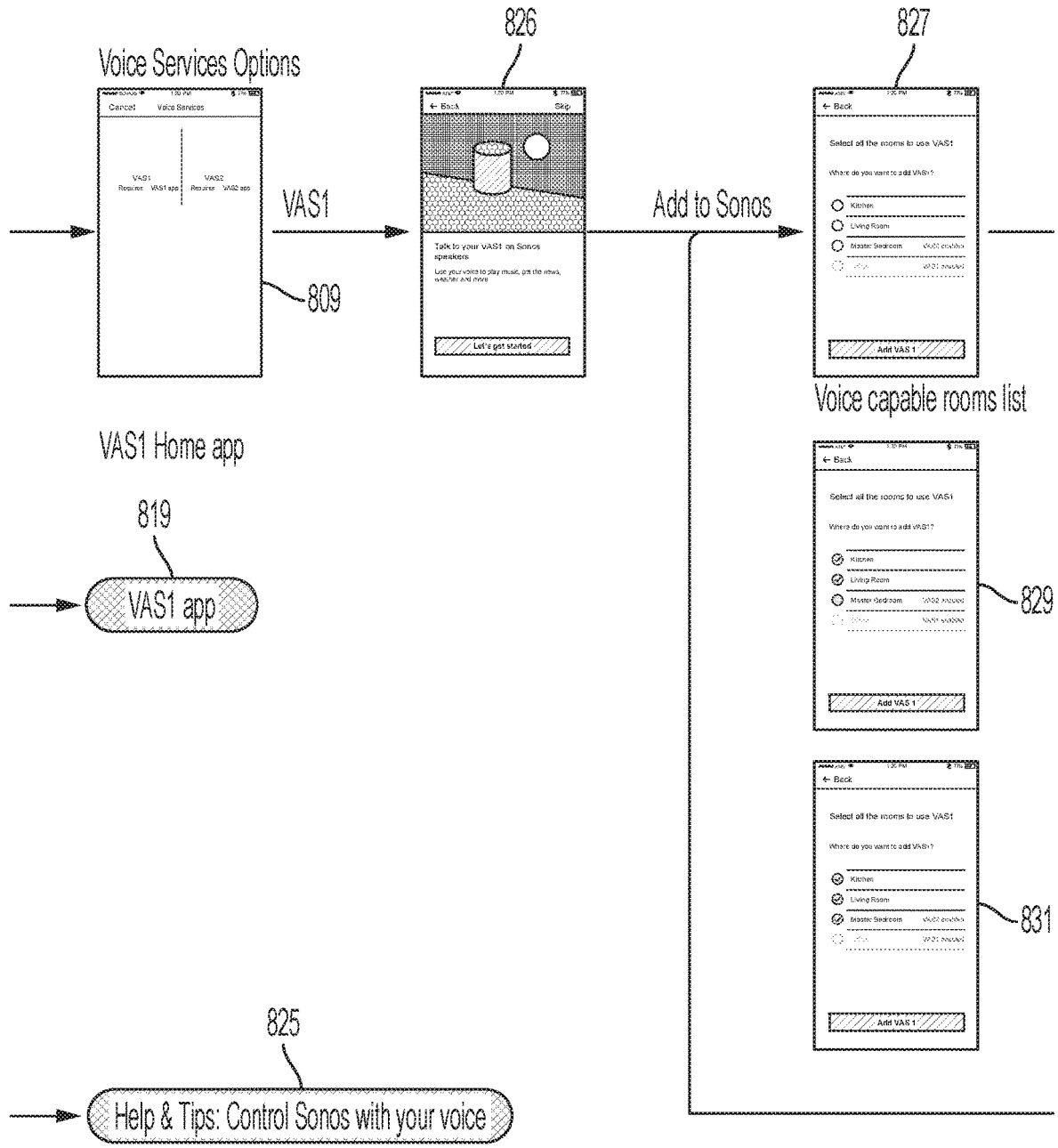

At decision block 807, if voice control has previously been enabled on the media playback system, then the process proceeds to FIG. 8B to select a voice service at interface 809. If, at decision block 807 of FIG. 8A, voice control has not previously been enabled on the media playback system, then the process continues to decision block 811 to determine whether a voice-capable playback device is present in the household. If there is a voice-capable playback device present, then the process proceeds to interface 813, where the user is prompted to select "Add a voice service."

If, in decision block 811, there is no voice-enabled playback device present in the household, the process continues to decision block 815 to determine whether a separate network microphone device associated with the first VAS (e.g., a VAS1 Home device) is present. If there is a VAS1 home device present, then the user is prompted, via interface 817, to access the VAS1 app. If, at interface 817, the user selects "Access the VAS1 app", the process continues to stage 819 in FIG. 8B with the user accessing the VAS1 app. Via the VAS1 app, the user can identify a previously configured network microphone device (e.g., a VAS1 home device) and associate that device with the selected playback device to enable voice control. For example, a non-voice-enabled playback device (e.g. a SONOS® PLAY:5™) may be coupled to a GOOGLE® HOME MINI networked microphone device. Together, the coupled devices can provide for voice-enabled control of audio playback. Additional details regarding identifying the presence of a VAS1 NMD can be found in U.S. Provisional Application No. 62/691,587, filed Jun. 28, 2018, which is hereby incorporated by reference in its entirety Returning to FIG. 8A, if, at decision block 815, there is no VAS1 home device present, the process returns to the main menu at stage 821 or else to interface 823, where the MPS app provides a user with a "Learn more" option to receive help and tips for accessing the enabled VAS. If this option is selected, the process proceeds to provide Help & Tips content at stage 825 (FIG. 8B). At this junction, the user has no detected voice-capable playback device and also has no separate VAS1 home device, and so the process is terminated without associating a VAS with a playback device.

Referring now FIG. 8B, the user is prompted, via user interface 809 of the MPS app, to select one among a plurality of VASes (here VAS1 and VAS2) to add to the particular playback device. After selection, the MPS app presents the selection (here, the user has selected VAS1) at interface 826 and prompts the user to continue the setup process (i.e., by selecting the "Let's get started" button).

FIG. 8B illustrates three variations of the interface that can follow the user's selection at interface 826. In each of interfaces 827, 829, and 831, the user interface can present all rooms that have voice-enabled devices (including playback devices with integrated network microphone devices as well as standalone network microphone devices). For example, as illustrated, the Kitchen and Living Room devices are not associated with any VAS, while the Master Bedroom device has been previously associated with another VAS (here VAS2). The Office device has been previously associated with VAS1, and so is not user-selectable at this interface. Using the radio buttons, the user can select the devices to which VAS1 should be added. If VAS1 has previously been added to a device (e.g., as with the "Office"), then the selection of Office can be grayed out to indicate that VAS1 cannot be added to this room. The user interface may also indicate rooms in which another VAS (e.g., VAS2) has previously been enabled, as with the "Master Bedroom" in which VAS2 has been enabled.

Figure 8C:
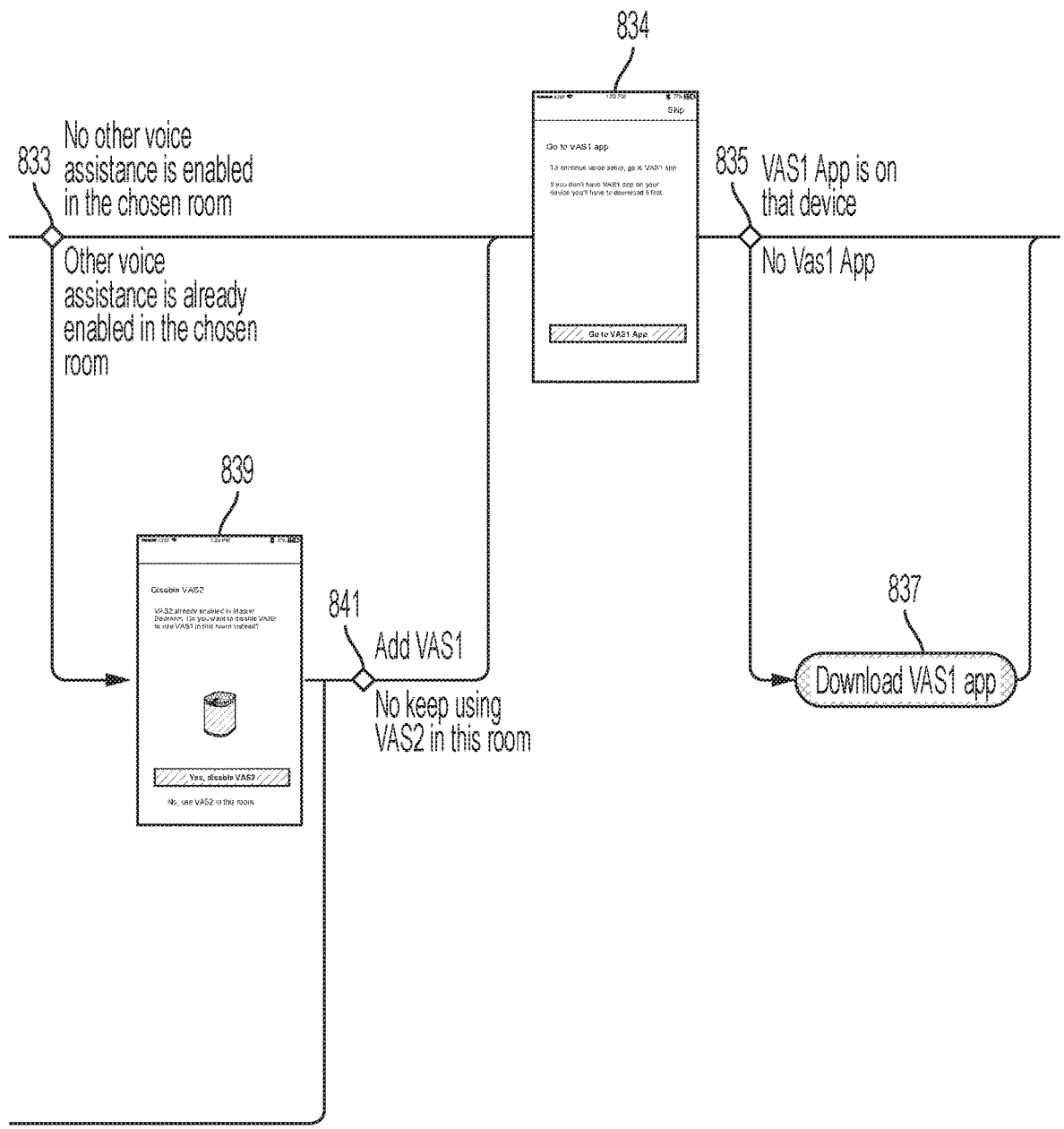
Figure 8D:
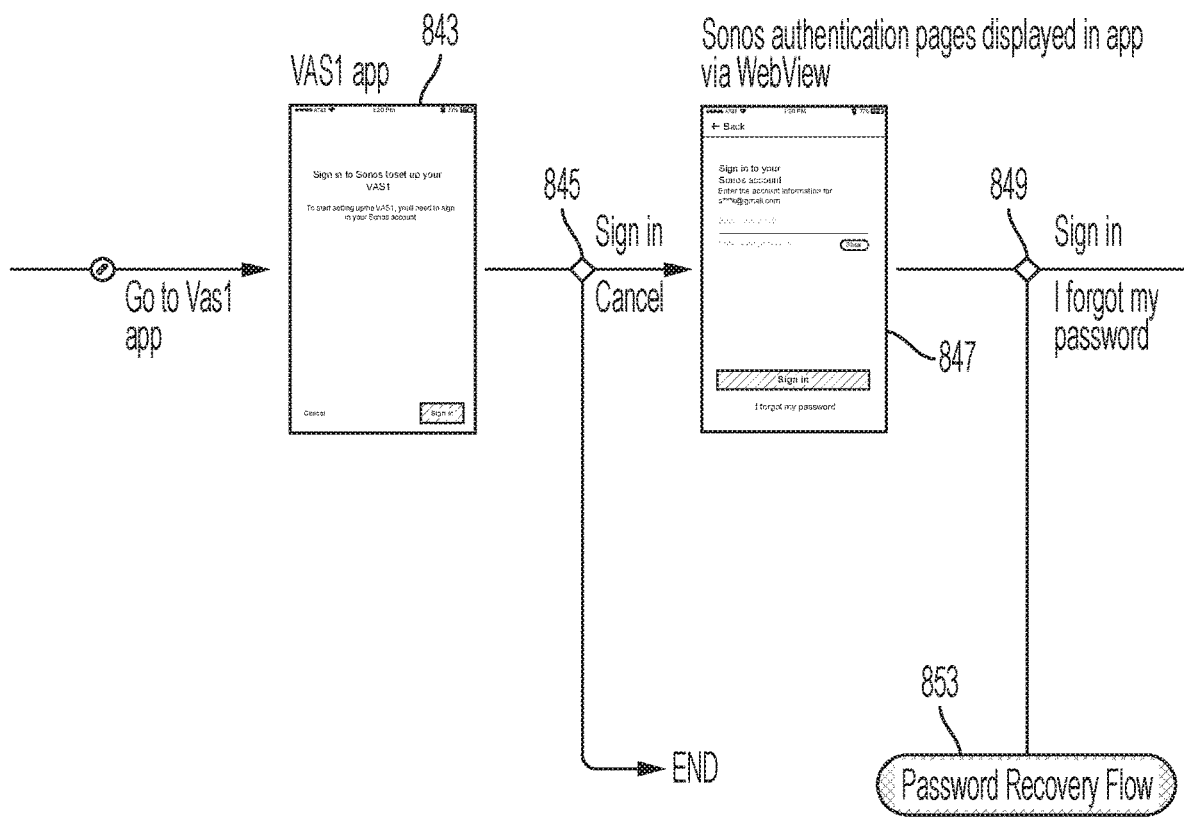
Figure 8E:
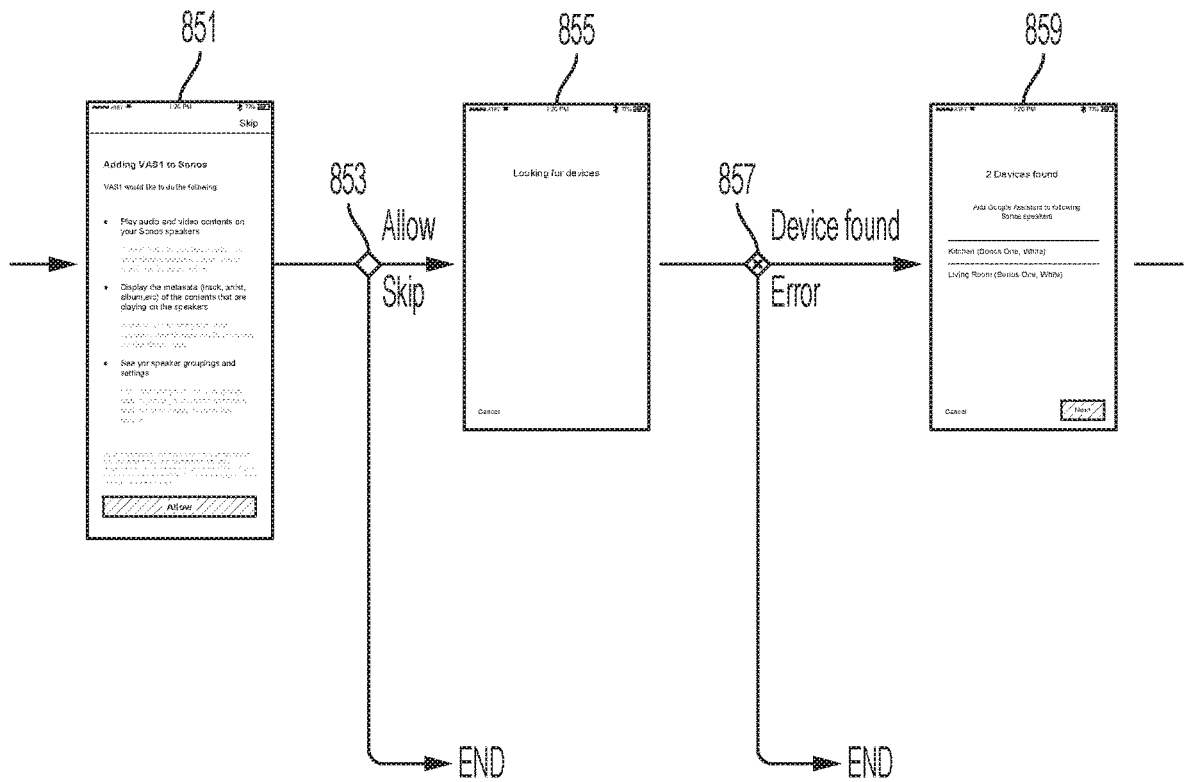
Figure 8F:
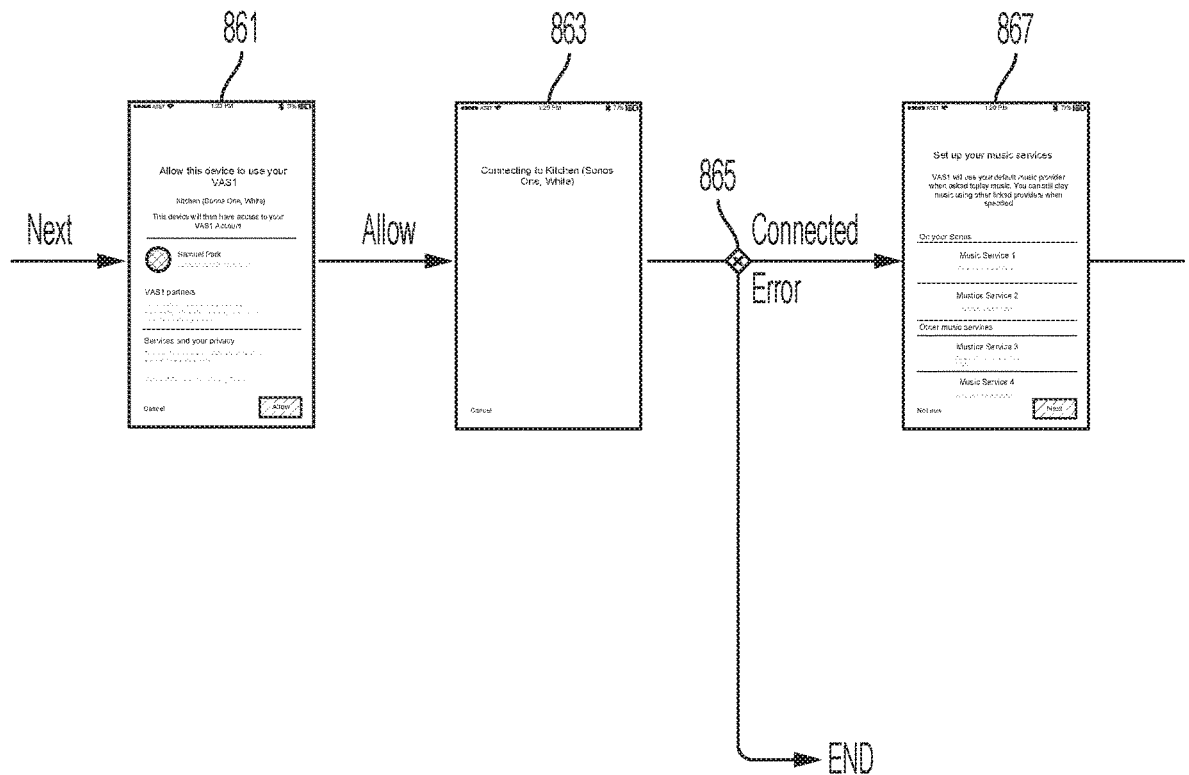

Once the user has selected, via one of interfaces 827, 829, or 831, the rooms to which VAS1 should be added, the process continues to FIG. 8C to decision block 833 to determine whether other voice assistance is enabled in the chosen room. If not, then the process continues to interface 834 to prompt the user to go to VAS1 app to continue the setup process. Once the user selects "Go to VAS1 App" at interface 834, the process continues to decision block 835 determine whether the VAS1 app has been installed on the user's device, and if not, the user is prompted to download the VAS1 app at stage 837.

Returning to decision block 833, if the process determines that other voice assistance is enabled in one or more of the chosen rooms, then the user is prompted via interface 839 to disable or unlink the previously enabled VAS (e.g., by displaying "Disable VAS2" and providing a first button labeled "Add VAS1" and a second button labeled "No, keep using VAS2"). As used herein, "disable" can indicate that the particular VAS will not be associated with the playback device and will not provide voice-control functionality. However, in some embodiments, the media playback system or the playback device can maintain the previously granted permissions, user credentials, and other information. Accordingly, if a user wishes to re-enable a previously disabled VAS, the process can be streamlined and the VAS can be re-enabled on a given playback device with relative ease.

In the illustrated embodiment, the user may only select one among several VASes for a particular room or playback device. Accordingly, if VAS2 was previously enabled in the Master Bedroom, then adding VAS1 to the Master Bedroom requires that VAS2 be unlinked or otherwise disabled from the Master Bedroom. If the user selects "No, keep using VAS2," at interface 839, then at decision block 841 the process returns to interfaces 827, 829, or 831 in FIG. 8B for adding a selected VAS to particular rooms. If, at interface 839, the user selects "Add VAS1," then at decision block 841 the process continues in FIG. 8C to decision block 835 to determine whether the VAS1 app is on the user's device as described previously. If the VAS1 app is not on the user's device, then the user is prompted to download the VAS1 app at stage 837. If the VAS1 app is on the user's device, then the process continues to FIG. 8D at interface 843.

Via interface 843, which can be displayed via the VAS1 app, the user is prompted to log into a user account associated with the MPS. If the user opts to sign in, then at decision block 845 the process continues to interface 847 to provide sign-in credentials. If, at decision block 845, the user selects cancel, then the process is terminated. Returning to interface 847, once the user provides credentials and selects "sign in," then at decision block 849 the process continues to interface 851 (FIG. 8E), where the user is prompted to provide permission to the VAS1 app to perform select functions, such as playing audio and video content over the playback device, display metadata, and view device groupings. If, at interface 847 (FIG. 8D), the user selects "I forgot my password," then at decision block 849 the process continues to stage 853 to initiate a password-retrieval process.

Returning to FIG. 8E, if, at interface 851, the user allows the requested access (e.g., by selecting the "Allow" button), then at decision block 853 of FIG. 8E the process continues to interface 855. If, at interface 855, the user selects "cancel," then at decision block 853 the process is terminated.

Returning to interface 855, the VAS1 app searches for voice-capable devices. If one or more such devices are found, then at decision block 857, the process continues to interface 859, where the identified device(s) are displayed to the user to provide selection or confirmation of the playback device to associate with VAS1 (e.g., by selecting the "Next" button). In some embodiments, the user can select multiple devices at interface 859 to associate with VAS1, while in other embodiments the user may be restricted to associating a single identified device at a time. If no device is found, then at decision block 857 the process proceeds to display an error message. At interface 859, once the user confirms the identified device (e.g., by selecting the "Next" button), the process continues to block 861, where the user is prompted to provide permission for the selected device to use the user's account associated with VAS1. If the use grants permission via interface 861, then the process continues to interface 863, which displays a message while the selected playback device being connected to VAS1.

If the connection is successful, then in decision block 865 the process continues to interface 867, where the user is prompted to select from among a pre-populated list of available music service providers that VAS1 can use to provide playback via the device. The list of music service providers can include those providers previously associated with the user's media playback system as well as music services that have not yet been associated with the media playback system.

For music service providers (or other media service providers such as podcast services, audiobook services, etc.) that have been previously associated with the user's media playback system, the media playback system may have stored user credentials and log-in information. In some embodiments, these credentials can be shared with VAS1 to facilitate VAS1's interaction and control of these services. For example, if a user previously linked a SPOTIFY account to the user's media playback system, then during this stage of setting up a voice assistant service, the media playback system can transmit the user's log-in credentials for the user's SPOTIFY account to VAS1. As a result, VAS1 can interact directly with SPOTIFY without requiring the user to re-enter log-in credentials.

Figure 8G:
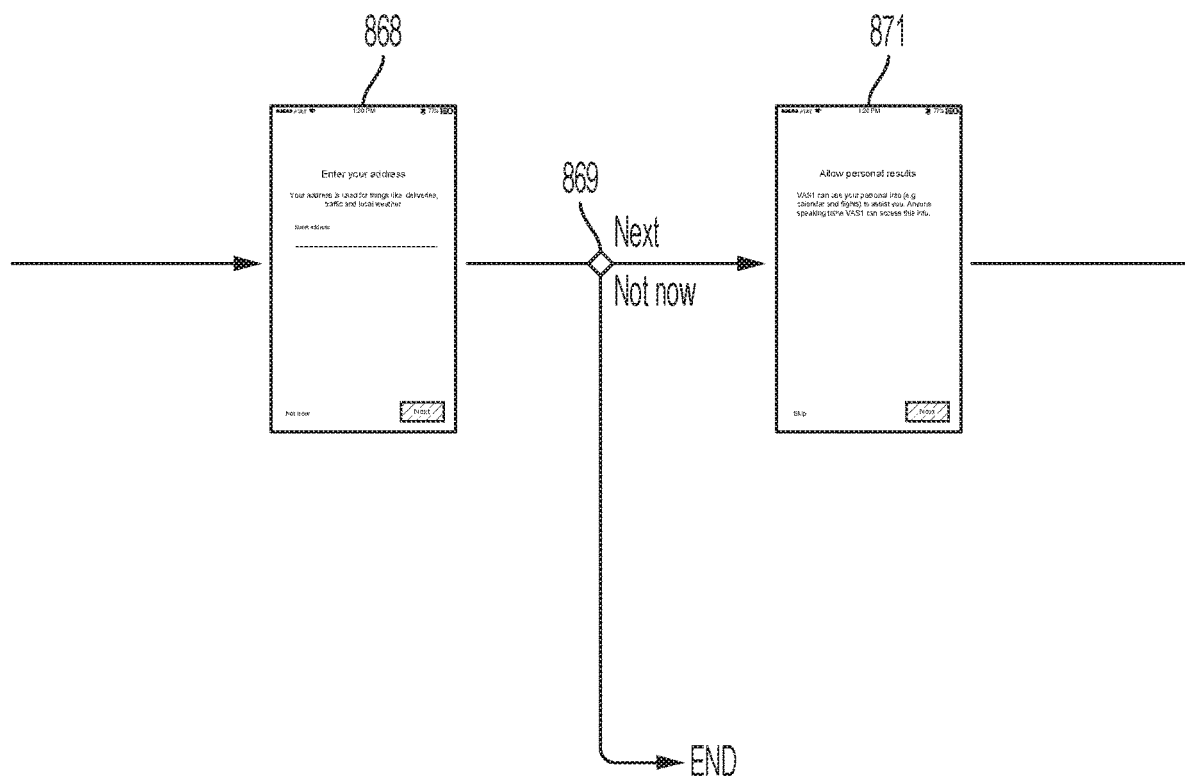

Once the user chooses one or more music service providers via interface 867 and selects "Next," the process continues FIG. 8G with interface 868, where the user is prompted to supply a home address and to allow personalized results provided via VAS1. In some embodiments, this information can be pre-populated for the user based on previously obtained information. Once a user provides the requested information or confirms the pre-populated information and selects the "Next" button, then at decision block 869 the process continues to interface 871, which prompts the user to provide permission for VAS1 to provide personalized results. If, at interface 868, the user selects "Not now" and does not provide a home address, then at decision block 869 the process terminates or can be redirected to another step in the process (e.g., interface 875).

At interface 871, the user can select "Next" to provide permission for personalized results or "Skip" to decline permission. If the user selects "Skip", then at decision block 871 of FIG. 8H, the process terminates or is redirected to another step in the process (e.g., interface 875). If the user selects "Next," then at decision block 873 the process continues to interface 875, which provides a message informing the user that the playback device has been set up with VAS1. The interface 875 shown illustrates a variety of possible keywords or phrases that a user can speak to engage VAS1 via the paired playback device. These keywords or phrases can be cognates to particular commands. Example cognates for the command "Play Music" include "Turn on the radio," "Play today's top hits," and "Play some upbeat pop." Example cognates for moving playback from one location to another include "Move the music to (room)," "Play this in (room), too," and "Take this into the (room)." Example cognates for Receiving Information from VAS1 include "What's the name of this song?", "When did Single Ladies come out?" and "When is Drake's concert near me?" Additional details regarding customization of cognates for various commands can be found in U.S. Provisional Application No. 62/691,587, filed Jun. 28, 2018, which is hereby incorporated by reference in its entirety.

Figure 8H:
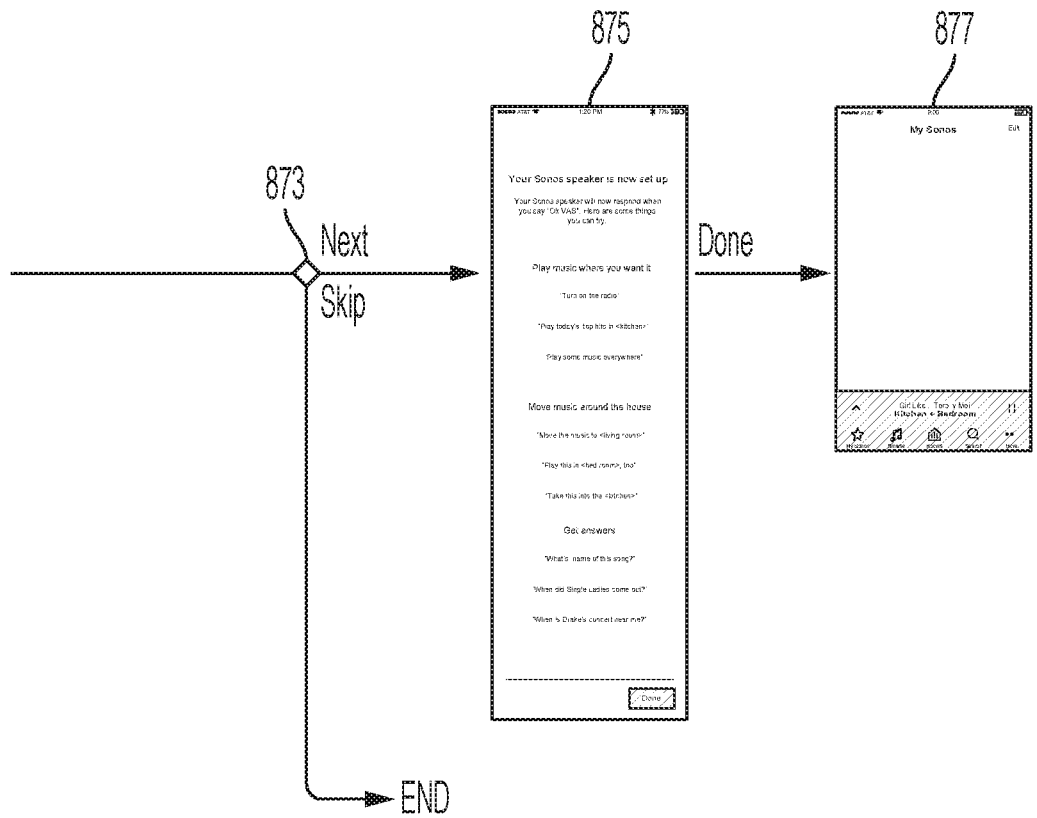

With continued reference to FIG. 8H, once the user selects "Done" via interface 875, then the process returns the user to MPS app, displaying interface 877 for example, and the setup process is complete. The process flow described above with respect to FIG. 8 is exemplary, and various modifications may be made in different embodiments. For example, the order of various steps may be altered, and certain steps may be omitted altogether (e.g., one or more of the confirmation screens or permission-requests may be omitted). Additionally, other steps may be incorporated into the process, for example allowing the user to customize additional aspects of the selected VAS1 for operation with the selected playback device.

Figure 9A:
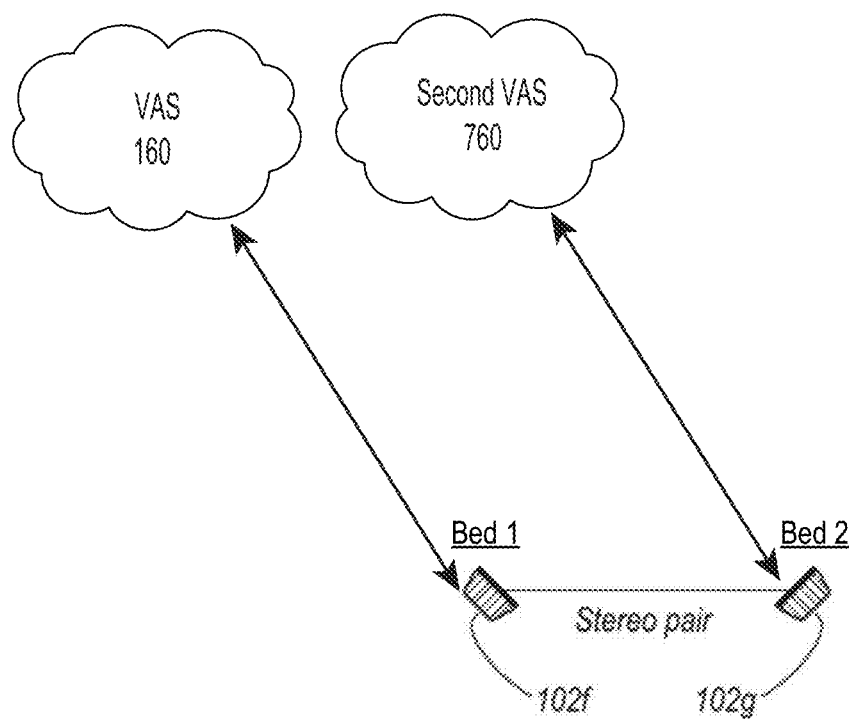
FIG. 9A illustrates a bonded pair of playback devices, each associated with a different voice assistant service in accordance with aspects of the disclosure.

FIG. 9A illustrates a bonded device pair with each device having a different associated VAS. As illustrated, the Bed1 playback device 102f and the Bed2 playback device 102g have been bonded to form a stereo pair. As a bonded pair, these playback devices can be presented to the media playback system for control as a single user interface (UI) entity. For example, the bonded pair can be presented to a user (e.g., via user interface 440 of FIG. 4) as a single device. While in some instances, such a stereo pair may be limited to a single VAS, in the illustrated embodiment each playback device 102f and 102g is associated with a separate VAS. Specifically, the Bed1 playback device 102f is associated with the first VAS 160 and the Bed2 playback device 102g is associated with the second VAS 760. For example, each of playback devices 102f and 102g can be associated with the respective VASes via a process as illustrated in FIG. 8. Before or after these playback devices have been enabled with their respective VASes, the playback devices can be bonded to form the stereo pair. As a result, a single stereo pair is enabled to interact with two different VASes. This can be extended to three, four, or more VASes with additional playback devices of a bonded zone being enabled with different VASes, as described below with respect to FIG. 9B.

Figure 9B:
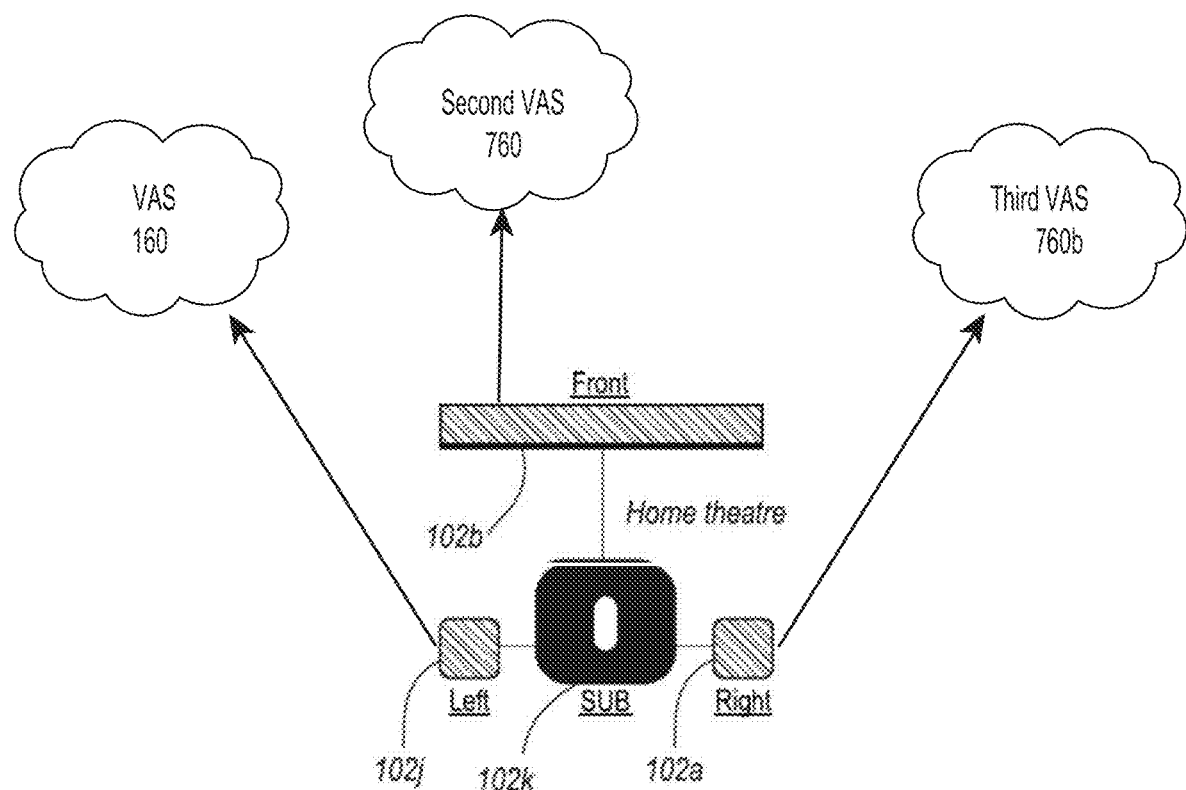
FIG. 9B illustrates a bonded zone of four playback devices, each associated with a different voice assistant service in accordance with aspects of the disclosure.

FIG. 9B illustrates a bonded zone of four playback devices, each associated with a different voice assistant service in accordance with aspects of the disclosure. Here, the bonded zone is a home theatre that includes a playback device 102b named Front that is bonded with the playback device 102k named SUB. The Front device 102b may render a range of mid to high frequencies and the SUB device 102k may render low frequencies as, e.g., a subwoofer. The Front and SUB devices 102b and 102k are further bonded with Right and Left playback devices 102a and 102k, respectively. In some implementations, the Right and Left devices 102a and 102k may form surround or "satellite" channels of a home theater system. The bonded playback devices 102a, 102b, 102j, and 102k together form a single bonded zone. As illustrated in FIG. 9B, each of these playback devices 102, 102b, 102j, and 102k can be associated with a different VAS (first VAS 160, second VAS 760, and third VAS 760b). As a result, a single home theatre zone is enabled to interact with four different VASes. In some embodiments, two or more of the individual playback devices of the bonded zone can be associated with the same VAS.

FIGS. 9C-9F illustrate example user interfaces for managing the VAS(es) associated with particular playback devices of a bonded zone in accordance with aspects of the disclosure. These example interfaces can be accessed, for example, using a Settings menu of the MPS app or other suitable software application. Specifically, the illustrated interfaces can be the Settings screen associated with a single zone (here, the Stereo (Zone B) zone, which includes the bonded stereo pair of Bed1 playback device 102f and Bed2 playback device 102g as shown in FIG. 9A). Using this interface, a user can add or change the VAS associated with individual devices of the bonded zone even after the bonded zone has been formed. In some embodiments, adding or adjusting the VAS associated with any given device of the bonded zone does not require that the bonded zone be re-established (e.g., the devices do not need to be re-calibrated, and the bonded zone remains intact).

Figure 9C:
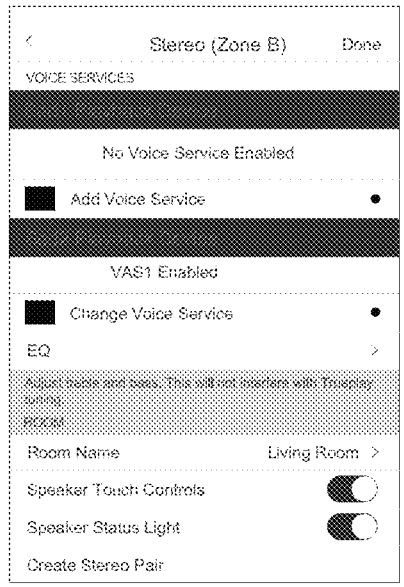
FIGS. 9C-9F illustrate example user interfaces for managing the VAS(es) associated with particular playback devices of a bonded zone in accordance with aspects of the disclosure.

In the example of FIG. 9C, the Bed1 playback device has no VAS enabled, and the user is presented with a button for "Add Voice Service" to add a new VAS. Meanwhile, the Bed2 playback device is indicated to already be associated with VAS1, and the user is presented with a "Change Voice Service" button if the user wishes to disable VAS1 on this device. Through this interface, the user can achieve various configurations of VAS associations with playback devices, including both devices having the same associated VAS, each device having a different associated VAS, or only one of the devices having an associated VAS, while the other has none.

Figure 9D:
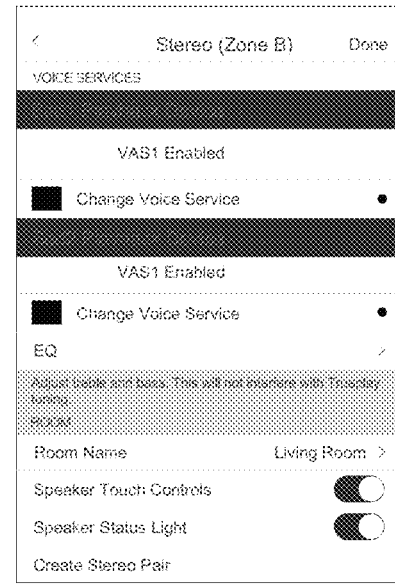

FIG. 9D illustrates an example in which the Bed1 playback device and the Bed2 playback device each have VAS1 enabled. The user is able to individually change these VAS associations, if desired, including removing any VAS association from either of the devices.

Figure 9E:
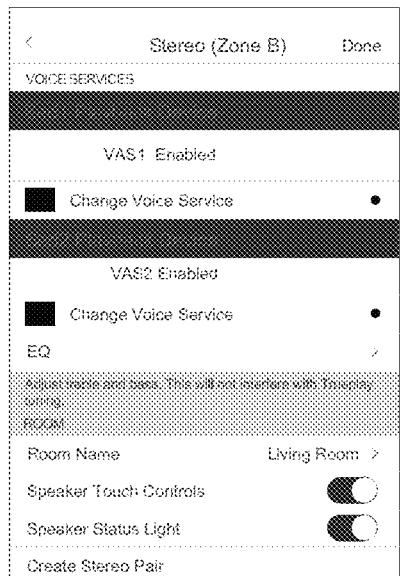

In FIG. 9E, the Bed1 playback device is associated with VAS1 while the Bed2 playback device is associated with VAS2. Again, these associations can be separately modified by the user as desired by selecting the "Change Voice Service" buttons.

Figure 9F:
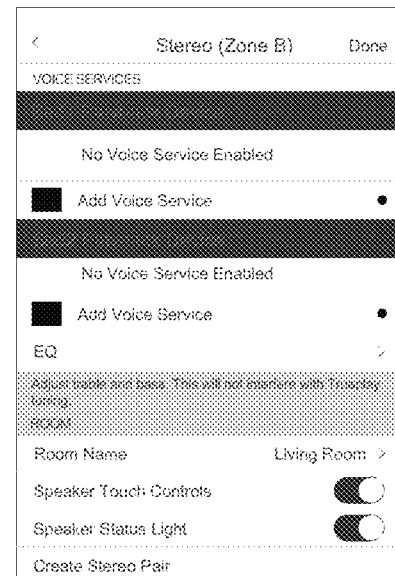

FIG. 9F illustrates an example in which neither the Bed1 playback device nor the Bed2 playback device is associated with a VAS. By selecting the "Add Voice Service" button for either device, the user can associate a desired VAS with one or both of these playback devices.

Figure 10:
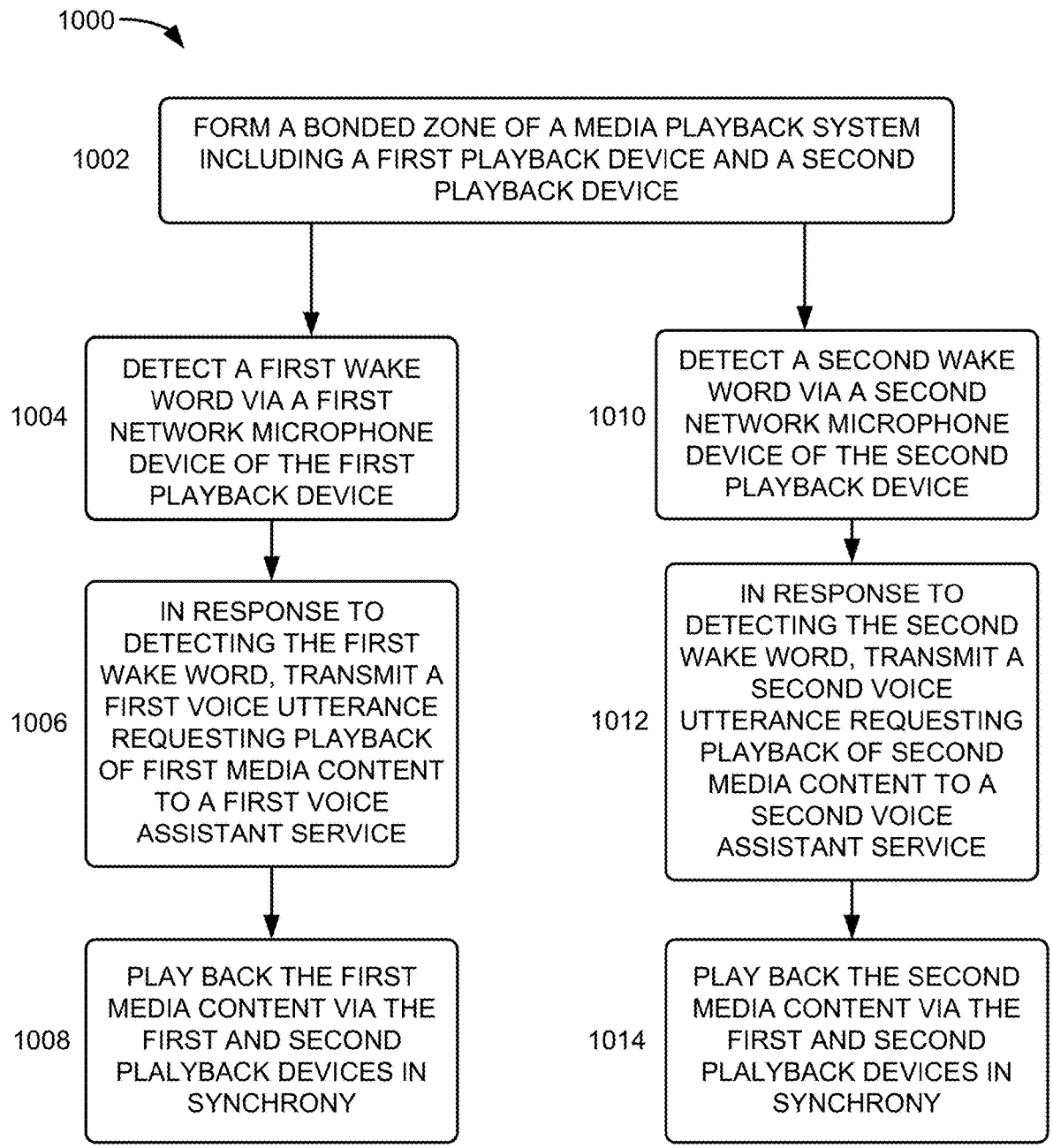
FIG. 10 illustrates an example method of interacting with two different voice assistant services via a bonded pair of playback devices in accordance with aspects of the disclosure.

In each instance shown in FIGS. 9C-9F, once the user selects "Add Voice Service" or "Change Voice Service," a process flow similar to that described above with respect to FIG. 8 can be initiated. For example, a user may be directed to interface 809 of FIG. 8B to select a particular VAS for association with the selected playback device. FIG. 10 illustrates an example method 1000 of utilizing a bonded device pair as shown in FIG. 9, in which each device has a different associated VAS. In block 1002, the method forms a bonded zone of a media playback system including a first playback device and a second playback device. For example, the first and second playback devices can be devices 102f and 102g shown in FIG. 9, which are bonded to form a stereo pair, and can be presented to the media playback system as a single user interface (UI) entity. For example, when displayed to a user via the user interface 440 of the controller device 104 (FIG. 4), the bonded pair can be displayed as a single "device" for control. As noted previously, the individual devices of the bonded zone can be assigned different playback responsibilities, such as responsibilities for certain audio channels. For example, the Bed1 playback device 102f may be configured to play a left channel audio component, while the Bed2 playback device 102g may be configured to play a right channel audio component. In various embodiments, additional playback devices can be bonded together to form a bonded zone, for example, three, four, five, or more playback devices can form a bonded zone.

The method 1000 continues in block 1004 with detecting a first wake word via a first network microphone device of the first playback device. For example, the Bed1 playback device 102f can include a networked microphone device 103 (FIG. 2) configured to receive audio input. The audio input can be a voice input 557, which includes a wake word 557a and a voice utterance 557b (FIG. 5B).

In block 1006, the method transmits a first voice utterance to a first voice assistant service in response to detecting the first wake word in block 1004. As noted previously, the voice utterance can follow the first wake word detected by the networked microphone device in block 1004, and the first voice utterance can be captured via the same networked microphone device. The voice utterance can take several forms, for example including a request for playback of first media content such as a particular song, album, podcast, etc. In other embodiments, the voice utterance can be a command to be performed locally by the playback device, such as grouping or bonding the device with other playback devices, adjusting playback volume of the device, deactivating the microphone of the device, or other suitable commands.

The method 1000 proceeds to block 1008 to play back the first media content via the first and second playback devices in synchrony. For example, the media playback system can receive the requested media content from the first voice assistant service. This requested media content is then played back via the bonded zone, which includes the first and second playback devices playing back the audio content in synchrony with one another.

Returning to block 1002, the method 1000 also proceeds along a second flow to block 1010 to detect a second wake word via second network microphone device of the second playback device. For example, the second playback device can be the Bed2 playback device 102g and can include a networked microphone device 103 (FIG. 2) configured to receive audio input. As noted previously, the audio input can be a voice input 557 that includes a wake word 557a and a voice utterance 557b (FIG. 5B). This detection of the second wake word can occur before or after the detection of the first wake word in block 1004.

In block 1012, the method 1000 transmits a second voice utterance requesting playback of second media content to a second VAS. As noted above, the voice utterance can follow the second wake word detected by the networked microphone device in block 1010, and the second voice utterance can be captured via the same networked microphone device.

The method 1000 continues in block 1014 with playing back the second media content via the first and second playback devices in synchrony. For example, the media playback system can receive the requested media content from the second voice assistant service. This requested media content is then played back via the bonded zone, which includes the first and second playback devices playing back the audio content in synchrony with one another.

In some embodiments, the second wake word can be different from the first wake word and may also be associated with a different VAS. For example, the first wake word detected in block 1004 may be "Alexa" and the first VAS may be AMAZON's ALEXA, while the second wake word detected in block 1010 can be "OK, Google" and the second VAS may be GOOGLE's Assistant. Various other configurations are possible. For example, the first or second wake word can be associated with local commands, and the first or second VAS can be a local service rather than one associated with one or more remote computing devices. For example, the second wake word can be "Hey Sonos" and the second voice assistant service can be a local VAS stored on one or more of the playback devices of the media playback system, configured to respond to voice input and perform commands (e.g., adjusting volume, grouping or bonding playback devices, deactivating microphones, etc.).

By associating individual devices of a bonded zone with different voice assistant services (which can have different corresponding wake words), the method allows a user to interact with a single UI entity (i.e., the bonded pair or zone, which appears as a single device via the media playback system) that can interact with two different VASes. Accordingly, even if individual playback devices cannot be associated with multiples VASes, a user may have access to multiple VASes via a single UI entity via the bonded zone. This advantageously allows a user to realize the benefits of multiple VASes, each of which may excel in different aspects, rather than requiring a user to limit her interactions to a single VAS to the exclusion of any others.

Figure 11:
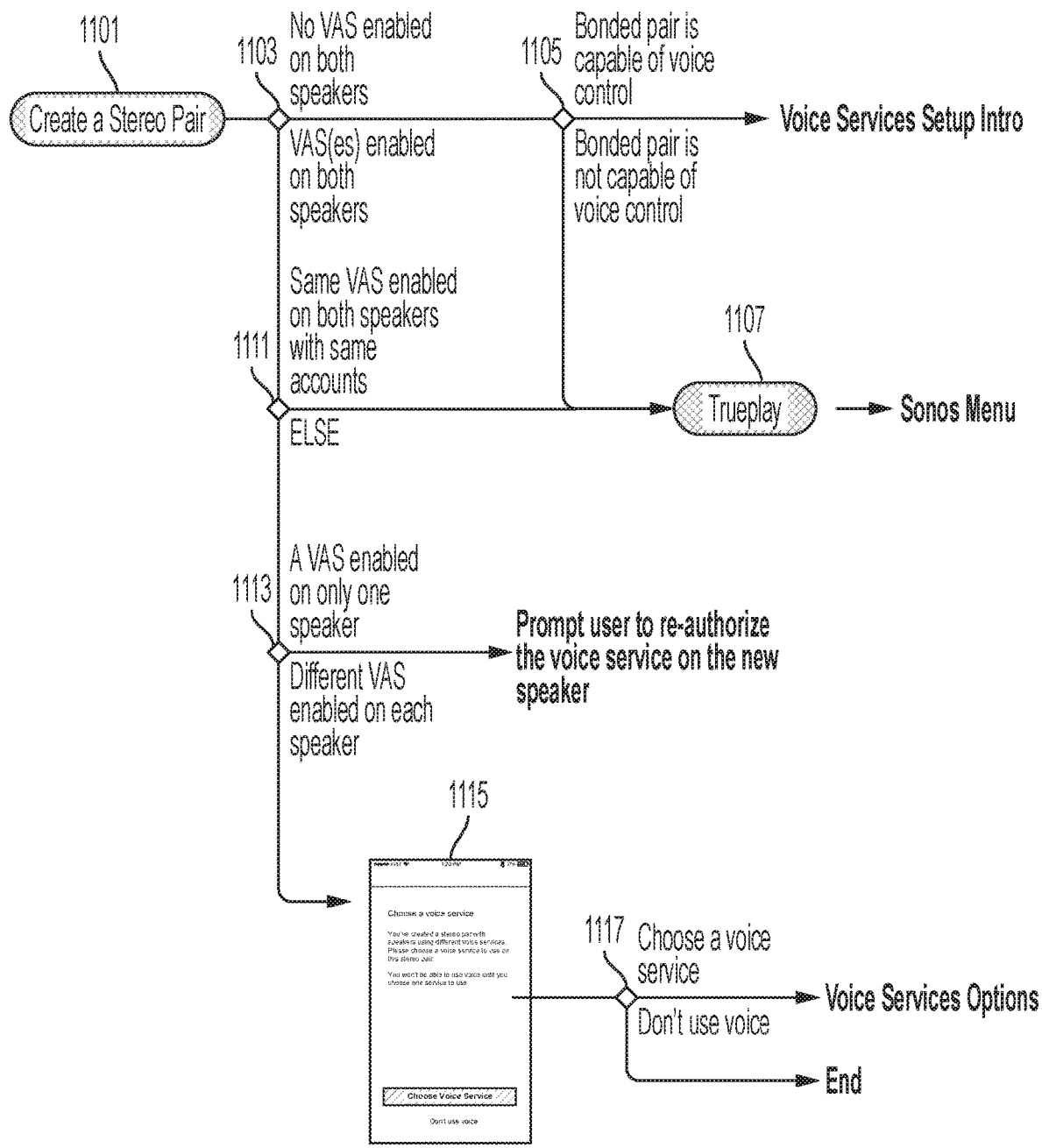
FIG. 11 is a flow diagram of an example process flow for associating a stereo pair of playback devices with a voice assistant service in accordance with aspects of the disclosure.

FIG. 11 is a process flow for associating a stereo pair of playback devices with a single voice assistant service. In some embodiments, it may be desirable to preclude a user from associating different individual devices of a bonded zone with different VASes. For example, with two devices of a stereo pair, or a plurality of devices of a home theatre setup, it may be desirable to limit the bonded zone to a single VAS. However, in some instances, devices may have previously been associated with different VASes prior to formation of the bonded zone. To accommodate the formation of a bonded zone without allowing multiple VASes, a process flow as outlined in FIG. 11 can be used. The process begins with bonding two playback devices to create a stereo pair. This can be achieved as described previously, for example via the MPS app, user voice input, or other suitable input that results in a bonded stereo pair. The process continues to decision block 1103 to determine whether either of the two playback devices has an associated VAS. If neither device has an associated VAS, then the process continues to decision block 1105 to determine whether the bonded pair is capable of voice control (i.e., whether the playback devices have integrated NMDs or associated NMDs through which to receive voice input). If, at decision block 1105, the bonded pair is capable of voice control, then the process continues to Voice Services Setup Intro (interface 813 in FIG. 8B). Following this flow, the bonded pair of devices can together be associated with a single VAS (e.g., VAS1 as described in FIG. 8). If, at decision block 1105, the bonded pair is not capable of voice control, then the process continues to Trueplay™ at stage 1107 for calibrating the devices for stereo playback for a particular room or space. In this instance, the bonded pair is not associated with any VAS.

Returning to decision block 1103, if both devices have an associated VAS, then the process continues to decision block 1111 to determine whether each device is associated with the same VAS. If so, then the process continues to Trueplay™ at stage 1107. In this instance, the bonded stereo pair is configured to be associated with a single VAS, which is the same VAS that each device was previously associated with.

If, in decision block 1111, both playback devices do not have the same associated VAS, the process continues to decision block 1113. If only one of the two playback devices has an associated VAS, then the user is prompted to re-authorize the VAS on the newly added playback device. For example, if the first playback device of the stereo pair has previously been associated with VAS1, while the second playback device has not been associated with any VAS, then once the two devices are bonded to form the stereo pair, the user can be prompted to authorize the second playback device to associate with VAS1. As a result, the bonded stereo pair can be configured to operate with VAS1.

At decision block 1113, if each playback device of the stereo pair has a different associated VAS, then the user is prompted via interface 1115 to select one among the two different VASes. In decision block 1117, if the user opts to select a VAS, then the process continues to Voice Services Options (interface 809 of FIG. 8). This flow will disable or unlink one of the playback devices from its previously associated VAS, and instead associate that playback device with the same VAS that is associated with the other device of the bonded pair. For example, if a first playback device of a bonded stereo pair is associated with VAS1, and a second playback device of the bonded stereo pair is associated with VAS2, then at interface 1115, the user is prompted to select VAS1 or VAS2 for the bonded stereo pair. If the user selects VAS2, then VAS1 will be disabled or unlinked from the first playback device, and instead the first playback device will be associated with VAS2. AS a result, the bonded stereo pair will be limited to association with a single VAS. If, at interface 115, the user selects "Don't use voice," then at decision block 1117 the process terminates and the bonded stereo pair will have no associated VAS.

CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

In addition to the examples described herein with respect to grouping and bonding playback devices, in some implementations multiple playback devices may be merged together. For example, a first playback device may be merged with a second playback device to form a single merged "device." The merged playback devices and may not be specifically assigned different playback responsibilities. That is, the merged playback devices and may, aside from playing audio content in synchrony, each play audio content as they would if they were not merged. However, the merged devices may present to the media playback system and/or to the user as a single user interface (UI) entity for control.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A method comprising: detecting a first wake word via a first network microphone device of a first playback device; detecting a second wake word via a second network microphone device of a second playback device; forming a bonded zone of a media playback system, the bonded zone comprising the first playback device and the second playback device; in response to detecting the first wake word via the first network microphone device: transmitting a first voice utterance requesting playback of first media content to one or more remote computing devices associated with a first voice assistant service; and playing back the first media content via the first and second playback devices of the bonded zone in synchrony with one another; and in response to detecting the second wake word via the second network microphone device: transmitting a second voice utterance requesting playback of second media content to one or more remote computing devices associated with a second voice assistant service; and playing back the second media content via the first and second playback devices of the bonded zone in synchrony with one another. Example 2: The method of Example 1, wherein the first wake word is associated with the first voice assistant service, and the second wake word is associated with the second voice assistant service, and wherein the first wake word is different from the second wake word. Example 3: The method of Examples 1 or 2, wherein the at least a portion of the first voice utterance is additionally captured via the second network microphone device, and wherein the second network microphone device does not transmit the first voice utterance to the one or more remote computing devices associated with the second voice assistant service. Example 4: The method of any one of Examples 1-3, further comprising presenting, via the media playback system, the bonded zone as a single user interface (UI) entity. Example 5: The method of Example 4, wherein presenting the bonded zone comprises displaying, via a controller device of the media playback system, the bonded zone as a single device. Example 6: The method of any one of Examples 1-5, wherein forming the bonded zone is performed before detecting the first wake word and detecting the second wake word. Example 7: The method of any one of Examples 1-6, further comprising: before detecting the first wake word, associating the first network microphone device with a first wake word engine, and before detecting the second wake word, associating the second network microphone device with a second wake word engine, different from the first wake word engine. Example 8: The method of any one of Examples 1-7, wherein the first playback device and the second playback device are assigned different playback responsibilities when playing back the first media content and the second media content in synchrony with one another. Example 9: The method of any one of Examples 1-8, further comprising, after forming the bonded zone, calibrating the first playback device and the second playback device concurrently. Example 10: The method of any one of Examples 1-9, further comprising grouping a third playback device with the bonded zone, and wherein the playing back the first media content comprises playing back the first media content via the first, second, and third playback devices in synchrony with one another. Example 11: A media playback system, comprising: one or more processors; a first network microphone device; a second network microphone device; and tangible, non-transitory, computer-readable medium storing instructions executable by one or more processors to cause the media playback system to perform operations comprising: the method of any one of Examples 1-10. Example 12: Tangible, non-transitory, computer-readable medium storing instructions executable by one or more processors to cause a media playback system to perform operations comprising: the method of any one of Examples 1-10.

The invention claimed is:

1. A method comprising:
    forming a bonded zone of a media playback system, wherein the media playback system comprises a first playback device and a second playback device, wherein forming the bonded zone comprises (i) configuring each of the first and second playback devices to have a different playback responsibility than the other and (ii) representing the bonded zone as a single user interface (UI) entity device in the media playback system, and wherein the playback responsibility of the first playback device includes playing back a left audio channel and the playback responsibility of the second playback device includes playing back a right audio channel;
    detecting a first wake word via a first network microphone device of the first playback device while part of the bonded zone;
    in response to detecting the first wake word via the first network microphone device:
        transmitting a first voice utterance requesting playback of first media content to one or more remote computing devices associated with a first voice assistant service; and
        playing back the first media content via the first and second playback devices of the bonded zone in synchrony with one another;
    detecting a second wake word via a second network microphone device of the second playback device while part of the bonded zone, and
    in response to detecting the second wake word via the second network microphone device:
        transmitting a second voice utterance requesting playback of second media content to one or more remote computing devices associated with a second voice assistant service; and
        playing back the second media content via the first and second playback devices of the bonded zone in synchrony with one another.

2. The method of claim 1, wherein forming the bonded zone further comprises configuring a third playback system of the media playback device to form a part of the bonded zone and to have a different playback responsibility than the playback responsibilities of the first playback device and the second playback device.

3. The method of claim 1, further comprising, after forming the bonded zone, calibrating the first playback device and the second playback device concurrently.

4. The method of claim 1, further comprising grouping a third playback device with the bonded zone, and wherein the playing back the first media content comprises playing back the first media content via the first, second, and third playback devices in synchrony with one another.

5. The method of claim 1, wherein representing the single UI entity device comprises displaying, via a controller device of the media playback system, a graphical representation of the single UI device.

6. The method of claim 1, further comprising:
    before detecting the first wake word, associating the first network microphone device with a first wake word engine, and
    before detecting the second wake word, associating the second network microphone device with a second wake word engine, different from the first wake word engine.

7. A media playback system, comprising:
    one or more processors;
    a first network microphone device;
    a second network microphone device; and
    tangible, non-transitory, computer-readable medium storing instructions executable by one or more processors to cause the media playback system to perform operations comprising:
        forming a bonded zone of a media playback system, wherein the media playback system comprises a first playback device and a second playback device, wherein forming the bonded zone comprises (i) configuring each of the first and second playback devices to have a different playback responsibility than the other and (ii) representing the bonded zone as a single user interface (UI) entity device in the media playback system, and wherein the playback responsibility of the first playback device includes playing back a left audio channel and the playback responsibility of the second playback device includes playing back a right audio channel;
        detecting a first wake word via a first network microphone device of the first playback device while part of the bonded zone;
        in response to detecting the first wake word via the first network microphone device:
            transmitting a first voice utterance requesting playback of first media content to one or more remote computing devices associated with a first voice assistant service; and
            playing back the first media content via the first and second playback devices of the bonded zone in synchrony with one another;
        detecting a second wake word via a second network microphone device of the second playback device while part of the bonded zone; and
        in response to detecting the second wake word via the second network microphone device:

transmitting a second voice utterance requesting playback of second media content to one or more remote computing devices associated with a second voice assistant service; and playing back the second media content via the first and second playback devices of the bonded zone in synchrony with one another.

8. The media playback system of claim 7, wherein forming the bonded zone further comprises configuring a third playback device of the media playback system to form a part of the bonded zone and to have a different playback responsibility than the playback responsibilities of the first playback device.

9. The media playback system of claim 7, wherein the operations further comprise: after forming the bonded zone, calibrating the first playback device and the second playback device concurrently.

10. The media playback system of claim 7, wherein the operations further comprise grouping a third playback device with the bonded zone, and wherein the playing back the first media content comprises playing back the first media content via the first, second, and third playback devices in synchrony with one another.

11. The media playback system of claim 7, wherein representing the single UI entity device comprises displaying, via a controller device of the media playback system, a graphical representation of the single device.

12. The media playback system of claim 7, wherein the operations further comprise:

before detecting the first wake word, associating the first network microphone device with a first wake word engine, and before detecting the second wake word, associating the second network microphone device with a second wake word engine, different from the first wake word engine.

13. Tangible, non-transitory, computer-readable medium storing instructions executable by one or more processors to cause a media playback system to perform operations comprising:

forming a bonded zone of a media playback system, wherein the media playback system comprises a first playback device and a second playback device, wherein forming the bonded zone comprises (i) configuring each of the first and second playback devices to have a different playback responsibility than the other and (ii) representing the bonded zone as a single user interface (UI) entity device in the media playback system, and wherein the playback responsibility of the first playback device includes playing back a left audio channel and the playback responsibility of the second playback device includes playing back a right audio channel;

detecting a first wake word via a first network microphone device of the first playback device while part of the bonded zone;

in response to detecting the first wake word via the first network microphone device:

transmitting a first voice utterance requesting playback of first media content to one or more remote computing devices associated with a first voice assistant service; and playing back the first media content via the first and second playback devices of the bonded zone in synchrony with one another;

detecting a second wake word via a second network microphone device of the second playback device while part of the bonded zone; and in response to detecting the second wake word via the second network microphone device:

transmitting a second voice utterance requesting playback of second media content to one or more remote computing devices associated with a second voice assistant service; and playing back the second media content via the first and second playback devices of the bonded zone in synchrony with one another.

14. The tangible, non-transitory, computer-readable medium of claim 13, wherein forming the bonded zone further comprises configuring a third playback device of the media playback system to form a part of the bonded zone and to have a different playback responsibility than the playback responsibilities of the first playback device and the second playback device.

15. The tangible, non-transitory, computer-readable medium of claim 13, wherein the operations further comprise: after forming the bonded zone, calibrating the first playback device and the second playback device concurrently.

16. The tangible, non-transitory, computer-readable medium of claim 13, wherein the operations further comprise grouping a third playback device with the bonded zone, and wherein the playing back the first media content comprises playing back the first media content via the first, second, and third playback devices in synchrony with one another.

17. The tangible, non-transitory, computer-readable medium of claim 13, wherein representing the single UI entity device comprises displaying, via a controller device of the media playback system, a graphical representation of the single UI device.

18. The method of claim 2, wherein the third playback device does not include a network microphone device.

19. The media playback system of claim 8, wherein the third playback device does not include a network microphone device.

20. The tangible, non-transitory, computer-readable medium of claim 14, wherein the third playback device does not include a network microphone device.

* * * * *

UNITED STATES PATENT AND TRADEMARK OFFICE
CERTIFICATE OF CORRECTION

PATENT NO. : 10,681,460 B2
APPLICATION NO. : 16/022662
DATED : June 9, 2020
INVENTOR(S) : Woo et al.

Page 1 of 1

It is certified that error appears in the above-identified patent and that said Letters Patent is hereby corrected as shown below:

In the Claims

In Column 31, in Claim 1, Line 61, delete "zone," and insert -- zone; --, therefor.

In Column 32, in Claim 2, Line 5, after "third playback" delete "system" and insert -- device --, therefor.

In Column 32, in Claim 2, Line 6, after "media playback" delete "device" and insert -- system --, therefor.

Signed and Sealed this
Eleventh Day of August, 2020

Andrei Iancu
*Director of the United States Patent and Trademark Office*